United States Patent
Hu et al.

(10) Patent No.: US 8,934,460 B1
(45) Date of Patent: *Jan. 13, 2015

(54) DUAL SIM DUAL ACTIVE SUBSCRIBER IDENTIFICATION MODULE WITH A SINGLE TRANSMIT CHAIN AND DUAL OR SINGLE RECEIVE CHAIN

(71) Applicant: QUALCOMM Incorporated, San Diego, CA (US)

(72) Inventors: Jun Hu, San Diego, CA (US); Rashid Ahmed Akbar Attar, San Diego, CA (US); Joseph B. Soriaga, San Diego, CA (US); Jing Sun, San Diego, CA (US); Huang Lou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/267,551

(22) Filed: May 1, 2014

Related U.S. Application Data

(63) Continuation of application No. 14/156,439, filed on Jan. 15, 2014, and a continuation-in-part of application No. 14/134,898, filed on Dec. 19, 2013.

(60) Provisional application No. 61/856,440, filed on Jul. 19, 2013.

(51) Int. Cl.
| | | |
|---|---|---|
| H04L 12/28 | (2006.01) | |
| H04W 76/02 | (2009.01) | |
| H04W 72/12 | (2009.01) | |
| H04W 4/16 | (2009.01) | |
| H04J 1/16 | (2006.01) | |
| H04W 76/04 | (2009.01) | |
| H04W 88/06 | (2009.01) | |

(52) U.S. Cl.
CPC ........ *H04W 76/026* (2013.01); *H04W 72/1215* (2013.01); *H04W 4/16* (2013.01); *H04W 76/045* (2013.01); *H04W 88/06* (2013.01)
USPC ............ 370/337; 370/252; 370/329; 370/442

(58) Field of Classification Search
USPC .................................. 370/252, 329, 337, 442
See application file for complete search history.

(56) References Cited

U.S. PATENT DOCUMENTS

| | | | |
|---|---|---|---|
| 2007/0027589 A1* | 2/2007 | Brinkley et al. ................... | 701/3 |
| 2010/0149361 A1* | 6/2010 | Takeuchi .................... | 348/222.1 |
| 2011/0274040 A1 | 11/2011 | Pani et al. | |
| 2012/0040672 A1 | 2/2012 | Chin et al. | |
| 2013/0042276 A1* | 2/2013 | Payette et al. ................... | 725/62 |
| 2013/0114436 A1 | 5/2013 | Dural et al. | |
| 2013/0189985 A1 | 7/2013 | Mutya et al. | |
| 2013/0237257 A1 | 9/2013 | Walke et al. | |
| 2013/0286957 A1* | 10/2013 | Bucknell et al. ............... | 370/329 |

* cited by examiner

*Primary Examiner* — John Pezzlo
(74) *Attorney, Agent, or Firm* — Loza & Loza LLP

(57) ABSTRACT

A method, an apparatus, and a computer program product are provided. The apparatus may be configured to establish a first call for a first subscription, and accept a second call for a second subscription while maintaining the first call. A single RF transmit chain may be scheduled for uplink transmissions associated with the first call and uplink transmissions associated with the second call. A timesharing schedule for the transmit chain may determine timing for the uplink transmissions associated with the first call is transmitted and when the uplink transmissions associated with the second call is transmitted on the transmit chain. Downlink transmissions associated with the first and second calls may be received using different receive chain. Downlink transmissions associated with the first and second calls may be received using the same receive chain.

30 Claims, 11 Drawing Sheets

DUAL SIM DUAL ACTIVE SUBSCRIBER IDENTIFICATION MODULE WITH A SINGLE TRANSMIT CHAIN AND DUAL OR SINGLE RECEIVE CHAIN

CROSS-REFERENCE TO RELATED APPLICATIONS

The present application for patent is a continuation of, and claims priority to application Ser. No. 14/156,439 entitled "Dual SIM Dual Active Subscriber Identification Module With A Single Transmit Chain And Dual Or Single Receive Chain" filed Jan. 15, 2014, which is a continuation-in-part of application Ser. No. 14/134,898 entitled "Dual SIM Dual Active Subscriber Identification Module With A Single Transmit Chain And Dual Or Single Receive Chain" filed Dec. 19, 2013, which is assigned to the assignee hereof, and claims priority to Provisional Application No. 61/856,440 entitled "Dual SIM Dual Active Subscriber Identification Module With A Single Transmit Chain And Dual Or Single Receive Chain" filed Jul. 19, 2013, which is assigned to the assignee hereof, which applications are hereby expressly incorporated by reference herein.

BACKGROUND

1. Field

Aspects of the present disclosure relate generally to wireless communication systems, and more particularly, to management of wireless devices that support multiple subscriptions.

2. Background

Wireless communication systems are widely deployed to provide various communication services such as telephony, video, data, messaging, broadcasts, and so on. Wireless communications networks, which are usually multiple access networks, support communications for multiple users by sharing the available network resources. Examples of such networks include networks based on the Global System for Mobile Communications (GSM), the Universal Mobile Telecommunications System (UMTS), and Long Term Evolution (LTE), which are defined by the 3rd Generation Partnership Project (3GPP), as well as cdma2000 1x standards including cdma2000 Radio Transmission Technology (1xRTT) and cdma2000 1xEV-DO (Evolution-Data only), which are defined by the 3rd Generation Partnership Project 2 (3GPP2), among others. An LTE network may be a Time-Division Long-Term Evolution (TD-LTE), also referred to as Long-Term Evolution Time-Division Duplex (LTE-TDD), as well as Frequency Division Duplex (FDD) versions of LTE (LTE-FDD).

Wireless communication systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems. Multiple types of devices are adapted to utilize such wireless communications systems. Such devices may be generally referred to as access terminals.

A service provider (or network operator) may deploy multiple radio access technologies in a given wireless communication system to enable users of differently capable access terminals to access the service provider's system. For example, a service provider may deploy radio access technologies such as a 4th generation (4G) LTE network, a 3rd generation (3G) Evolution-Data Optimized cdma2000 (EV-DO) network (as defined by the 3GPP2 standards body), cdma2000 1x network (also defined by 3GPP2), a UMTS network utilizing a Time Division Synchronous Code Division Multiple Access (TD-SCDMA) air interface or a wideband CDMA (W-CDMA) air interface, and/or a 2nd generation (2G) network such as GSM.

In some instances, access terminals may be capable of communicating on two or more different radio access technologies. Such access terminals are often referred to as hybrid devices or hybrid access terminals. One common hybrid access terminal may be referred to as a 1x/DO hybrid access terminal, which is capable of communicating on both 3G EV-DO networks and on 2G cdma2000 1x networks. Another example of a hybrid access terminal may be referred to as a LTE/DO hybrid access terminal, which is capable of communicating on both 4G LTE networks and 3G EV-DO networks.

Certain wireless networks identify subscribed users by means of a subscriber identity module (SIM). Some wireless devices support multiple concurrently installed SIMs and may provide a plurality of transceivers to support concurrent active connects. Conventionally, a dual active device has two transceivers and may support two concurrently active connections when two or more SIMs are installed. The two concurrently active connections may include some combination of circuit-switched (CS) and packet-switched (PS) traffic. If two SIMs are active on traffic calls in a dual-active device, the remaining SIMs generally enter an out-of-service (OOS) state.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect of the disclosure, methods, computer program products, and apparatus are provided that support multiple concurrent active connections. The apparatus may include a user equipment (UE), a modem, a transceiver and/or an access terminal.

In one aspect, the disclosure provides a method of managing multiple connections for a wireless device, including the steps of establishing a first call for a first subscription associated with an access terminal, accepting a second call for a second subscription associated with the access terminal while maintaining the first call in an active state, and scheduling a single radio frequency (RF) transmit chain provided in the access terminal for uplink transmissions associated with the first call and uplink transmissions associated with the second call when the access terminal is operating in a dual SIM dual active (DSDA) mode.

In another aspect of the disclosure, the single RF transmit chain provided in the access terminal may be scheduled to restrict uplink transmissions to a single call when the access terminal is operating in a dual SIM dual stand-by (DSDS) mode. The access terminal may fall back to the DSDS mode from the DSDA mode when one or more channel conditions are determined. The channel conditions may include high network loading, a high transmit power and/or a difficult RF co-existence situation. The access terminal may choose which call should remain active based on priorities of the calls.

In another aspect of the disclosure, scheduling the single RF transmit chain includes establishing a timesharing schedule for the single RF transmit chain. A switch provided between a modem and the single RF transmit chain may be controlled in accordance with the timesharing schedule. The timesharing schedule may determine timing for the uplink transmissions associated with the first call and timing for the uplink transmissions associated with the second call on the single RF transmit chain. Scheduling a single RF transmit chain may include configuring timesharing schedule for the single RF transmit chain based on channel conditions and call priorities.

In another aspect of the disclosure, the first call is established as a highest priority call. Uplink transmissions associated with the second call may be gated when uplink transmissions associated with the first call are required. The uplink transmissions associated with the second call that are gated may include an ACK channel. The ACK channel transmission associated with the second call may be fully gated when the uplink transmissions associated with the second call are gated. The ACK channel transmission associated with the second call may be fully gated if network scheduling of the first call requires the ACK channel transmission associated with the second call to be partially gated.

In another aspect of the disclosure, the first call is established on a GSM network and the second call is established on a GSM network, CDMA network, a UMTS network, an LTE network (including LTE-FDD, LTE-TDD/TD-LTE networks), a cdma2000 EV-DO network, a cdma2000 1xRTT network, or a TD-SCDMA network. The first call may be established on cdma2000 1xRTT network, and the second call may be established on an LTE network (such as an LTE-FDD, LTE-TDD, or TD-LTE network).

In another aspect of the disclosure, wherein accepting the second call includes boosting a traffic-to-pilot ratio or increasing overhead channel gain.

In another aspect of the disclosure, a single RF receive chain provided in the access terminal is scheduled to receive downlink traffic associated with the first call and downlink traffic associated with the second call. The single RF receive chain may be scheduled by establishing a timesharing schedule for the single RF receive chain. A switch provided between a modem and the single RF receive chain may be controlled in accordance with the timesharing schedule. The timesharing schedule may determine when networks corresponding to the first call and the second call are monitored.

In another aspect of the disclosure, scheduling the single RF receive chain may include configuring a timesharing schedule for the single RF receive chain based on channel conditions and call priorities. Scheduling the single RF receive chain may include controlling a switch provided between a modem and the single RF receive chain in accordance with the timesharing schedule. Scheduling the single RF receive chain may include configuring the timesharing schedule based on at least one of the relative priorities associated with the first call and the second call, channel conditions, or quality of service requirements of the first call and the second call.

In another aspect of the disclosure, scheduling the single RF transmit chain or scheduling the single RF receive chain may include dynamically adapting a frequency at which transmitter power of a number of neighboring transmitters is monitored based on the number of the neighboring sectors.

Scheduling the single RF transmit chain or scheduling the single RF receive chain may include decreasing a power monitoring duration for a GSM network. Scheduling the single RF transmit chain or scheduling the single RF receive chain may include dropping one or more frames of a speech packet to be transmitted on the uplink based on channel conditions. Scheduling the single RF transmit chain or scheduling the single RF receive chain may include skipping a portion of a plurality of frames of a speech packet to be received on the downlink based on channel conditions. Scheduling the single RF transmit chain or scheduling the single RF receive chain may include skipping a portion of a plurality of frames of a speech packet to be received on the downlink when the speech packet is decoded using early decoding. Scheduling the single RF transmit chain or scheduling the single RF receive chain may include substituting silent frames for at least a portion of a plurality of frames transmitted or received on a GSM network.

In another aspect of the disclosure, the method includes compensating for phase discontinuities in a pilot signal detected on a network corresponding to one of the first call and the second call.

In another aspect of the disclosure, the first call and the second call are GSM calls, the first call has a higher priority than the second call, and the second call may be dropped when the first call and the second call are allocated a common time slot for communicating on a GSM network.

In another aspect of the disclosure, an apparatus adapted to manage multiple connections for a wireless device, includes means for establishing a first call for a first subscription associated with an access terminal, means for accepting a second call for a second subscription associated with the access terminal while maintaining the first call in an active state, and means for scheduling a single RF transmit chain provided in the access terminal for uplink transmissions associated with the first call and uplink transmissions associated with the second call when the access terminal is operating in a first mode. The first mode may be a DSDA mode. The apparatus may establish a timesharing schedule for the transmit chain. The timesharing schedule may determine the timing of uplink transmissions associated with the first call and when the timing of uplink transmissions associated with the second call on the transmit chain.

In another aspect of the disclosure, an apparatus for wireless communication includes a communications interface, and a processing circuit configured to establish a first call for a first subscription associated with an access terminal and accept a second call for a second subscription associated with the access terminal while maintaining the first call in an active state, and schedule a single RF transmit chain provided in the access terminal for uplink transmissions associated with the first call and uplink transmissions associated with the second call when the access terminal is operating in a first mode. The first mode may be a DSDA mode.

In another aspect of the disclosure, a processor-readable storage medium has one or more instructions which, when executed by at least one processing circuit, cause the at least one processing circuit to establish a first call for a first subscription associated with an access terminal, accept a second call for a second subscription associated with the access terminal while maintaining the first call in an active state, and schedule a single RF transmit chain provided in the access terminal for uplink transmissions associated with the first call and uplink transmissions associated with the second call when the access terminal is operating in a first mode. The first mode may be a DSDA mode.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
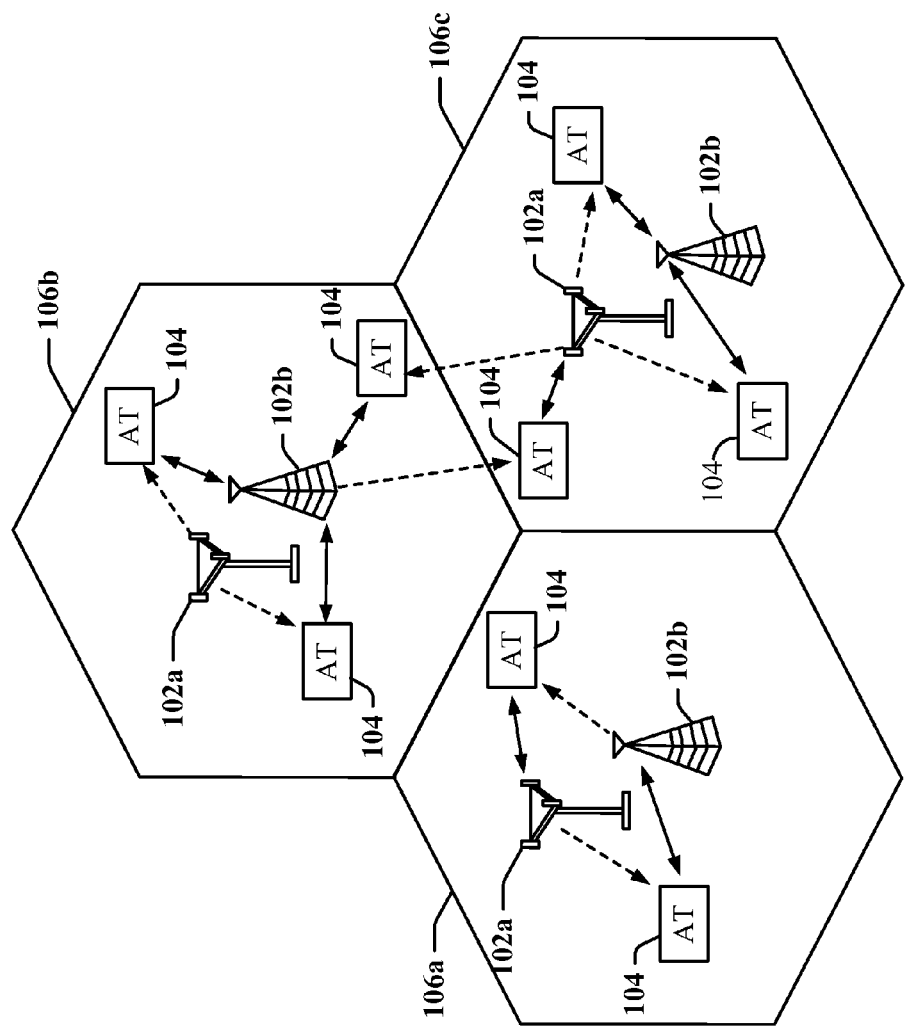
FIG. 1 is a block diagram of a network environment in which one or more aspects of the present disclosure may find application.

FIG. 1 is a block diagram illustrating a network environment in which one or more aspects of the present disclosure may find application. A wireless communications system 100 is adapted to facilitate wireless communication between one or more base stations 102 (e.g., 102a and 102b) and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

In this example, the wireless communications system 100 includes two radio access technologies (RATs). The first RAT may employ base stations 102a that support radio communication for access terminals 104 located within the coverage of these base stations 102a. Similarly, the second RAT may employ base stations 102b that support radio communication for access terminals 104 located within the coverage of these base stations 102b. Base stations 102a and 102b may be located at different sites or co-located at the same site.

The base stations 102 (e.g., 102a, 102b) can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, and evolved Node B (eNB), a femto cell, a pico cell, or some other suitable terminology.

Figure 2:
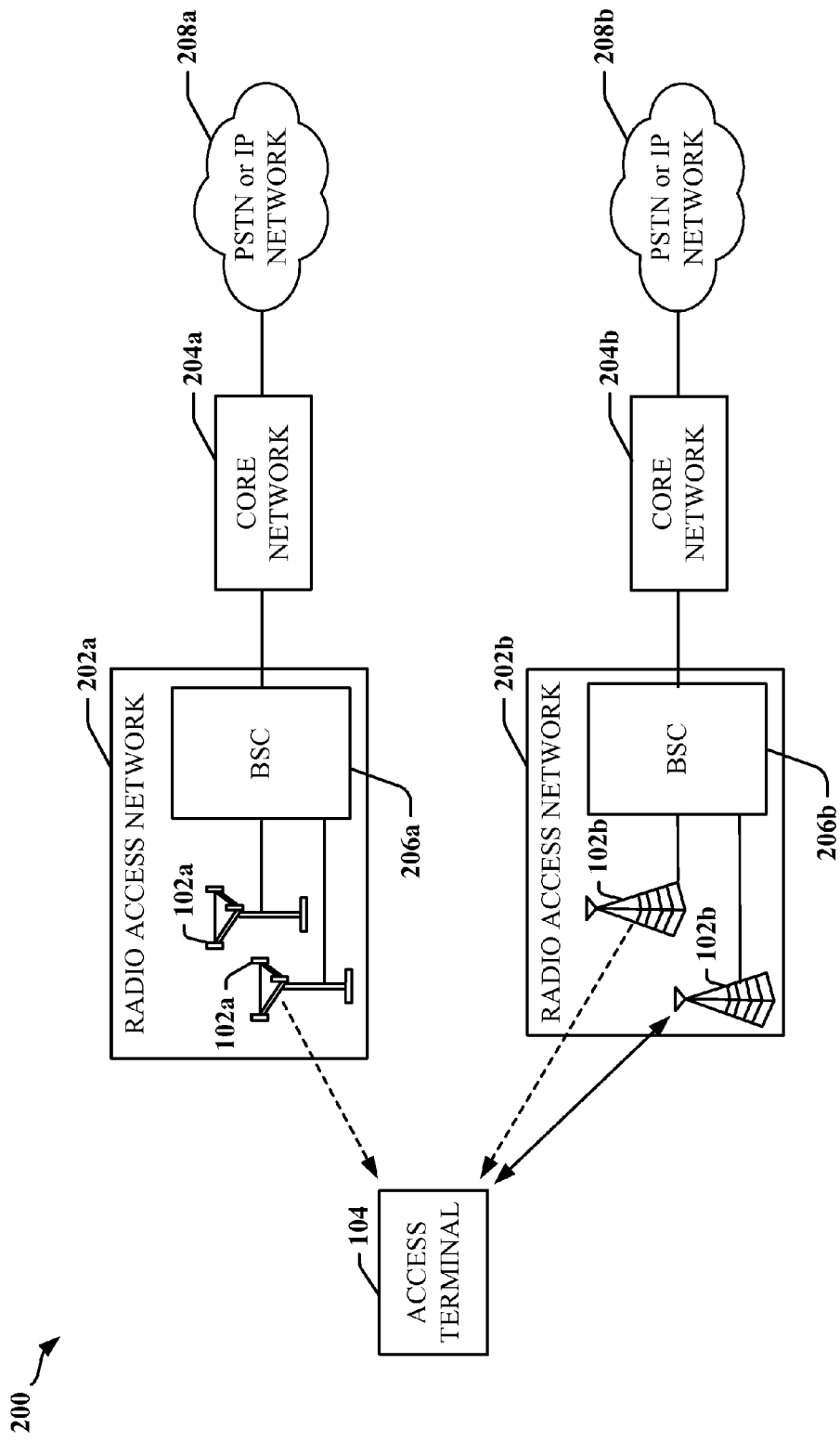
FIG. 2 is a block diagram illustrating select components of the wireless communication system of FIG. 1 according to at least one example.

The base stations 102 (e.g., 102a and 102b) are configured to communicate with the access terminals 104 under the control of a respective base station controller (see FIG. 2). Each of the base station 102 sites can provide communication coverage for a respective geographic area. The coverage area 106 for each base station 102 here is identified as sectors or cells 106a, 106b and 106c. In various examples, the system 100 may include base stations 102 of different types.

One or more access terminals 104 may be dispersed throughout the coverage areas 106. Each access terminal 104 may communicate with one or multiple base stations 102 at any given moment. In FIG. 1, a solid line with arrows indicates communication between an access terminal 104 and a base station 102. A dashed line with one arrow indicates reception of pilot and/or signaling (e.g., pages) by an access terminal 104 from the base station 102.

An access terminal 104 may generally include one or more devices that communicate with one or more other devices through wireless signals. Such an access terminal 104 may also be referred to by those skilled in the art as a UE, a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

FIG. 2 is a block diagram illustrating select components of the wireless communication system 100 according to at least one example. As illustrated, the base stations 102a and 102b are included as at least a part of a respective radio access network (RAN) 202a and 202b employing different RATs. The RANs 202a and 202b are generally adapted to manage traffic and signaling between one or more access terminals 104 and one or more other network entities, such as network entities included in a core network 204a or 204b. The RANs 202a and 202b may, according to a particular RAT implementation, be referred to by those skill in the art as a BSS, an access network, a GSM Edge Radio Access Network (GE-RAN), a UMTS Terrestrial Radio Access Network (UTRAN), etc.

In addition to one or more base stations 102a or 102b, each RAN 202a and 202b can include at least one respective base station controller (BSC) 206a, 206b, which may also be referred to by those of skill in the art as a radio network controller (RNC). The BSCs 206a, 206b are generally responsible for the establishment, release, and maintenance of wireless connections within one or more coverage areas associated with the base stations 102a, 102b connected to the BSC 206A, 206B.

The BSCs 206a, 206b can be communicatively coupled to one or more nodes or entities of the respective core networks 204a, 204b. Each core network 204a, 204b provides access to a public switched telephone network (PSTN) (e.g., via a mobile switching center/visitor location register (MSC/VLR)) and/or to an IP network (e.g., via a packet data switching node (PDSN)) 208a, 208b.

The first RAN 202a may use a first RAT, which may utilize any suitable technology including but not limited to GSM, UMTS, LTE, cdma2000 1x, EV-DO, etc., and the second RAN 202b may use a second RAT that may similarly utilize any suitable technology including but not limited to GSM, UMTS, LTE, cdma2000 1x, EV-DO, etc. In one non-limiting example provided for ease of description, the first RAT implemented by the first RAN 202a may comply or be compatible with the cdma2000 1x standard, while the second RAT implemented by the second RAN 202b may comply or be compatible with EV-DO communication standard. In another example, the first RAN 202a may be implemented using a 3G RAT such as EV-DO, while the second RAN 202b may be implemented using a 4G RAT such as LTE. As noted previously, the various features described herein may be employed with any combination of a number of different communications standards.

As depicted in FIG. 1, the coverage areas of the two or more RANs 202a, 202b employing different RATs may overlap within a geographical region. In such instances, the access terminals 104 may be under the coverage of a plurality of the RANs 202a, 202b at any given moment. When one or more of the access terminals 104 are implemented as hybrid access terminals 104, such hybrid access terminals 104 may be capable of accessing either or both of the RANs 202a, 202b at any given moment.

Typically, it is desirable for a hybrid access terminal 104 to conduct a data session on whichever RAN 202a, 202b provides the fastest data transmission speeds in order to provide a relatively better user experience. As used herein, the faster or otherwise more desirable RAN will be referred to as the "preferred RAN," and the less desirable RAN will be referred to as the "secondary RAN."

A hybrid access terminal 104 utilizing the secondary RAN is typically adapted to search for certain frequencies that are transmitted by the preferred RAN. The hybrid access terminal 104 may maintain a list of frequencies to monitor in a table, database, and/or in storage. The list of frequencies may be provided by one or more RANs 202a, 202b and/or may include frequencies previously detected or used by the hybrid access terminal 104. During a call with a secondary RAN, or at any other time, the hybrid access terminal 104 may monitor various parameters of the secondary RAN as well as various parameters of neighboring RANs. Further, depending on the quality of these parameters, the hybrid access terminal 104 may maintain communication with one or more of the neighboring RANs.

Figure 3:
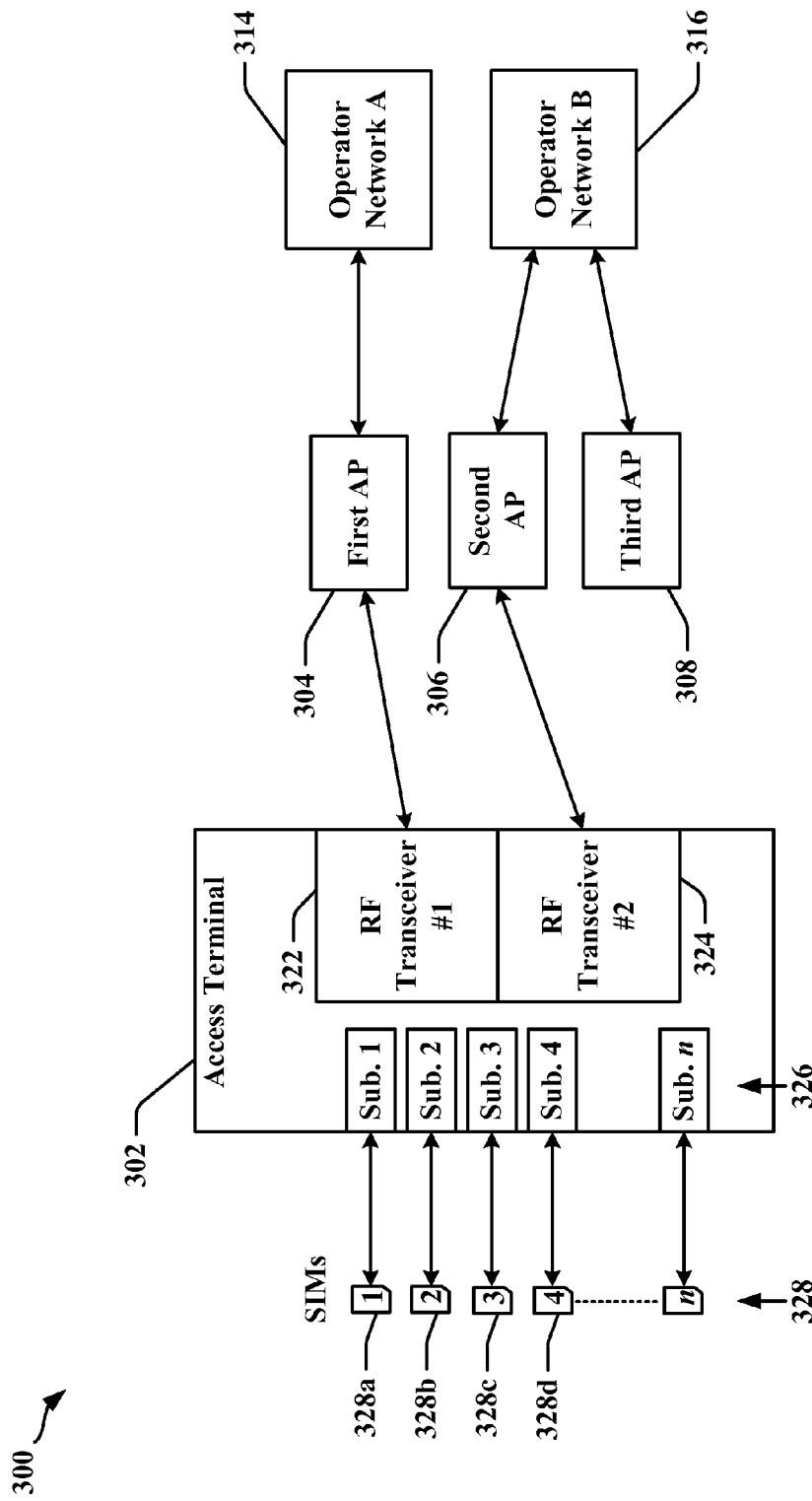
FIG. 3 is a schematic diagram illustrating an access terminal that supports multiple SIMs and connects to a plurality of networks.

FIG. 3 is a diagram illustrating an access terminal 302 adapted to operate concurrently in multiple networks. The multiple networks may include networks employing one or more of a GSM, UTRAN, LTE, cdma2000 1x, EV-DO architecture. The access terminal 302 may receive services provided by the core networks 314 and 316. The access terminal 302 may communicate with a first access point 304 to obtain services from a first network 314. The access terminal 302 may communicate with a second access point 306 to obtain services from a second network 316. The access terminal 302 may obtain services from a single core network 314 or 316 through two or more access points 304, 306 and/or 308. For example, the access terminal 302 may communicate with the second access point 306 and the third access point 308 to obtain services from the second network 316. Each network 314 and 316 may provide voice and/or data services through one or more RANs operated by the same or different network operators.

The access terminal 302 may be adapted or configured to support two or more SIMs 328 that can be used to identify and authenticate subscribed users of the different services offered by operators of the core networks 314, 316. In one example, each SIM 328 may store an IMSI 326 and related keys that can uniquely identify and authenticate a user of the access terminal 302 and subscribed services available to the user through the networks 314 and/or 316. Each SIM 328 may be associated with a telephone number or other network identifier different from telephone numbers or other identifiers associated with the other SIMs 328. In one example, the access terminal 302 is a mobile telephone device equipped with two or more SIMs 328 that enable the establishment of calls on two or more different voice and/or data networks, and to maintain two or more active calls concurrently. The use of multiple SIMs 328 may permit a user of the access terminal 302 to access and use features of different subscriptions to reduce costs, obtain superior service, etc.

The access terminal 302 may support a variety of operational modes when multiple SIMs 328 are installed in the access terminal 302. For example, in dual SIM dual stand-by (DSDS) mode, the access terminal 302 may initially be in standby mode for two different subscriptions. After establishing a call through one network 314 or 316, the access terminal 302 may cause the connection between the access terminal 302 and the other networks 316 or 314 to enter an inactive state.

In dual SIM dual active (DSDA) mode, the access terminal 302 may be concurrently connected to two different subscribed networks 314 and 316. A DSDA-enabled access terminal 302 may be capable of switching between two simultaneously active calls and/or connecting two active calls at the access terminal 302. In DSDA mode, the access terminal 302 may establish a first active call on a first subscribed network 314, while remaining idle on a second subscribed network 316. While a call is active on a first subscribed network 314 or 316, a DSDA-enabled access terminal 302 may receive a second call through a second subscribed network 316 or 314. If calls are simultaneously active on the first and second subscribed networks 314 and 316, a user may switch between the two calls as desired, and/or may connect the two calls at the access terminal 302. When more than two SIMs 328 are installed in the access terminal 302, other modes of operation may be defined, including triple SIM dual active (TSDA) mode, quad SIM dual active (QSDA) mode, for example.

A DSDA-enabled access terminal 302 may include two or more radio frequency (RF) transceivers 322 and 324. Each RF transceiver 322 and 324 may be operated independently and used for establishing and maintaining an active connection with an access point 304, 306, or 308 on behalf of subscriptions for a corresponding number of installed SIMS 328. The RF transceivers 322, 324 may be embodied in one or more RF modems and each transceiver 322 and 324 includes both a transmit (Tx) chain and a receive (Rx) chain. An RF modem may assign an Rx chain and a Tx chain for each RF transceiver 322, 324. Tx chains may include modulators, encoders, power amplifiers and other devices and circuits. Rx chains may include amplifiers, demodulators, decoders and other devices and circuits. Certain devices and circuits may be sharable between Rx chains. In the example depicted in FIG. 3, the access terminal 302 has two RF transceivers 322, 324 with dedicated Rx and Tx chains configured to support concurrent connections to different access points 304 and 306 corresponding to networks 314 and 316, respectively. An RF modem may additionally include one or more processors, non-transitory storage and logic configured to process, transmit and receive signals, and to encode and decode data transmitted and received by the access terminal 302.

In triple SIM dual active (TSDA) mode, the access terminal 302 may support three subscriptions but can be connected to only two different ones of access points 304, 306, 308 concurrently. In quad SIM dual active (QSDA) mode, the access terminal 302 may support four subscriptions but can be concurrently connected to only two different ones of access points 304, 306, 308. Typically, TDSA or QSDA modes are employed when the access terminal 302 is provided with only two RF chains 322 and 324 in order to optimize power consumption of the access terminal 302.

Figure 4:
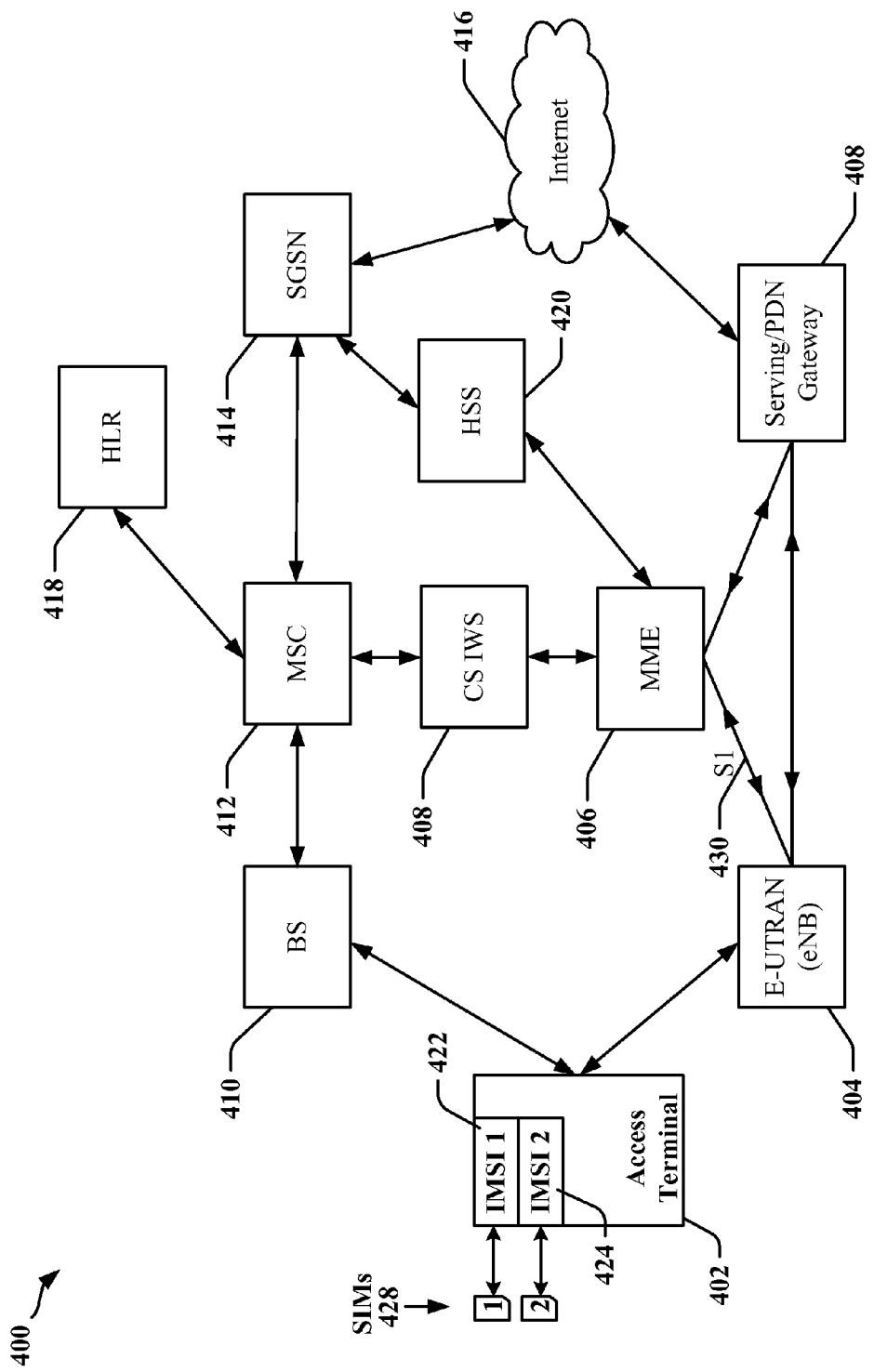
FIG. 4 is a schematic diagram illustrating a wireless network including radio access networks operated using different radio access technologies.

FIG. 4 is a block diagram 400 illustrating a simplified example of a wireless internetworking environment. An access terminal 402 may be associated with one or more access points 404, 410 that may be operated by the same or different network operators and that may operate using the same or different network technologies. The access point 404 and/or 410 may include, or be referred to, as a base station, a base transceiver station, a radio access point, an access station, a radio transceiver, a BSS, an ESS, a Node B, an eNB, or some other suitable terminology. Each access point 404, 410 may provide a radio interface in a RAN that provides access to core network services provided by one or more network operators. RANs may be implemented using any suitable RAT and telecommunication standards employing a variety of modulation and multiple access techniques. By way of example, RANs associated with access points 404, 410 may include one or more networks based on UTRAN, GSM, LTE, Evolved UTRA (E-UTRA) network, IEEE 802.11 (Wi-Fi), IEEE 802.16 (WiMAX), IEEE 802.20, and/or Flash-OFDM employing OFDMA. RANs may also include one or more cdma2000 networks or its variants such as cdma2000 1xRTT (also referred to as 1xRTT herein), EV-DO networks, including Ultra Mobile Broadband (UMB) networks.

In the depicted example, the access terminal 402 may be associated with a PS network, such as LTE, through an eNB 404, and the access terminal 402 may be associated with a CS network for data and voice calls through the base station 410. The access terminal 402 may be registered with an E-UTRAN (through the eNB 404) and a packet data network (PDN) gateway 410 may provide connectivity between the access terminal 402 and one or more external packet data networks 416. The access terminal 402 may be registered with a CS network, such as a 1xRTT network, through base station 410 in order to obtain voice and data services through a cdma2000 network.

GPRS permits 2G, 3G and W-CDMA mobile networks to transmit Internet Protocol (IP) packets to external networks such as the Internet 416 using a gateway function, which may include an SGSN 414. The SGSN 414 may provide certain interworking services enabling communication between the GPRS system and an external packet switched network 416. Certain aspects of the invention are equally applicable to other combinations of PS and CS networks, including GSM, LTE cdma2000 1x, and/or EV-DO, for example.

In the example depicted in FIG. 4, the MME 406 serves as a control node for LTE traffic related to the access terminal 402. The MME 406 typically processes signaling between the access terminal 402 and a core network, providing bearer and connection management services. In some embodiments, an interworking server (IWS) 408 may perform a single radio voice call continuity interworking solution function between UTRAN and E-UTRAN access networks. Accordingly, backhaul communications may be available between LTE and 1x networks, and other combinations of network types and technologies. The mobile switching center (MSC) 412 may control network switching elements used in the provision of 1xRTT voice services through base station 410.

The access terminal 402 may be deployed in a location where multiple accessible cells or RANs are available and the access terminal 402 may use different frequencies and/or different RATs to access a core network that provides mobility management, session management, transport for IP packet services, and other services. RATs may be based on UMTS, TD-SCDMA, GSM, cdma2000 and/or WiMAX, for example.

Figure 5:
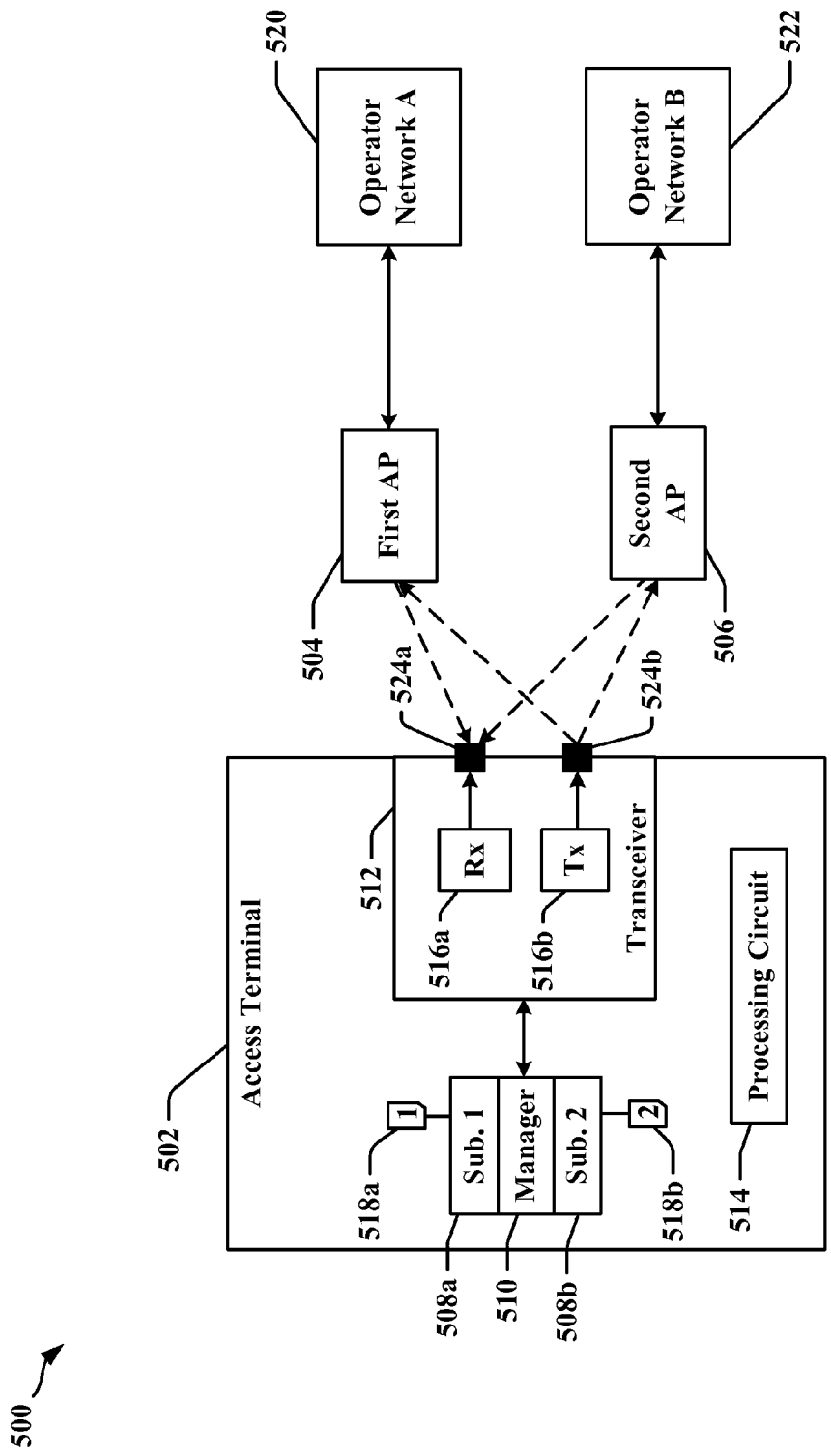
FIG. 5 is a block diagram illustrating a multi-SIM device with a single transceiver.

FIG. 5 is a simplified block diagram 500 illustrating a multi-SIM access terminal 502 according to certain aspects disclosed herein. The access terminal 502 may be equipped with a transceiver 512 that has fewer available Rx chains 516a and/or Tx chains 516b than the number of desired active connections. In one example, the access terminal 502 may communicate wirelessly through one Rx chain 516a and one Tx chain 516b and associated RF interfaces 524a, 524b, which may include RF amplifiers, antennas and other RF circuitry and components. In another example, the access terminal 502 may have idled one or more other transceivers or one or more Rx chains 516a and/or Tx chains 516b of the transceiver 512 in order to conserve power. The access terminal 502 may have multiple transceivers 512, but for ease of description, certain systems, methods and techniques disclosed herein may be described in context of an access terminal 502 that is constructed with a single transceiver 512 that includes a limited number of available Rx chains 516a and Tx chains 516b.

The access terminal 502 may be configured to receive services provided by one or more core networks 520, 522. In one example, the access terminal 502 may obtain services from a first network 520 through a first access point 504 and may obtain services from a second network 522 through a second access point 506. The access terminal 502 may obtain services from a single core network 520 or 522 on behalf of two different subscriptions 508a and 508b. Each core network 520 and 522 may provide voice services, data services or some combination of voice and data services through one or more RANs operated by the same or different network operators.

The access terminal 502 may be adapted or configured to support two subscriptions 508a and 508b, where the subscriptions are identified or otherwise correspond to SIMs 518a, 518b installed in the access terminal 502. A subscription manager 510 may be provided to manage the subscriptions 508a, 508b associated with the SIMs 518a and 518b. The subscription manager 510 may be implemented in a combination of hardware circuitry and software/firmware modules or other logic elements, and the operation of the subscription manager 510 may be controlled by the processing circuit 514.

The SIMs 518a and 518b can be used to identify and authenticate subscribed users of the various services offered by network operators. In one example, each SIM card 518a, 518b may store an IMSI and related keys that can uniquely identify and authenticate a subscribed user of the access terminal 502. Each SIM card 518a, 518b may enable access to subscribed services available to the user through the networks 520 and/or 522. Each subscription 508a or 508b may be associated with a telephone number or another network identifier, and the two subscriptions 508a and 508b typically include different telephone numbers or identifiers. In one example, the access terminal 502 may be a mobile telephone device equipped with two or more SIMs 518a, 518b that enable the establishment of traffic calls on two or more different voice and/or data networks. The access terminal 502 may be adapted or configured to maintain two or more concurrently active calls.

The access terminal 502 may be adapted or configured to support one or more multiple-active operational modes as disclosed herein to support network access for multiple subscriptions when the access terminal 502 has fewer RF transceivers 512 or fewer Rx chains 516a and/or Tx chains 516b than the available or desired number of connections. According to certain aspects disclosed herein, an enhanced dual SIM dual standby (eDSDS) mode may be defined whereby the access terminal 502 may be configured to receive calls for the second subscription 508b when a call for the first subscription 508a is active on the access terminal 502. When a first call is active on the access terminal 502 and a second call is indicated, a user of the access terminal 502 may determine whether the second call should be accepted or declined, even when there are fewer than two Rx chains 516a and/or two Tx chains 516b. The user may determine whether to accept the second call based on caller identification (Caller ID), for example. A declined voice call may be sent to voicemail, forwarded to another device, dropped, or otherwise deferred. In devices that support conventional DSDS, a voice call received for a second subscription 508b is automatically sent to voicemail, or otherwise forwarded or deferred when a call for the first subscription 508a is active.

In another example, the access terminal 502 may be configured to support a simultaneous dual SIM dual active (sDSDA) mode whereby the access terminal 502 may support two traffic calls simultaneously, using a single transceiver 512 that may have a single or dual Rx chains 516a and a single Tx chain 516b. The access terminal 502 may maintain a voice call for each of the two subscriptions 508a and 508b, with one of the two voice calls being placed on hold. The user may determine which of the two voice calls should be active, and which voice call should be placed on hold. In another example, such as an example corresponding to simultaneous voice and LTE, or SVLTE, the access terminal 502 may maintain a voice call for one of the two subscriptions 508a or 508, while a data connection is maintained for the other subscription 508b or 508a. In devices that support conventional DSDS, a data connection is automatically dropped when a voice call is received or active.

Figure 6:
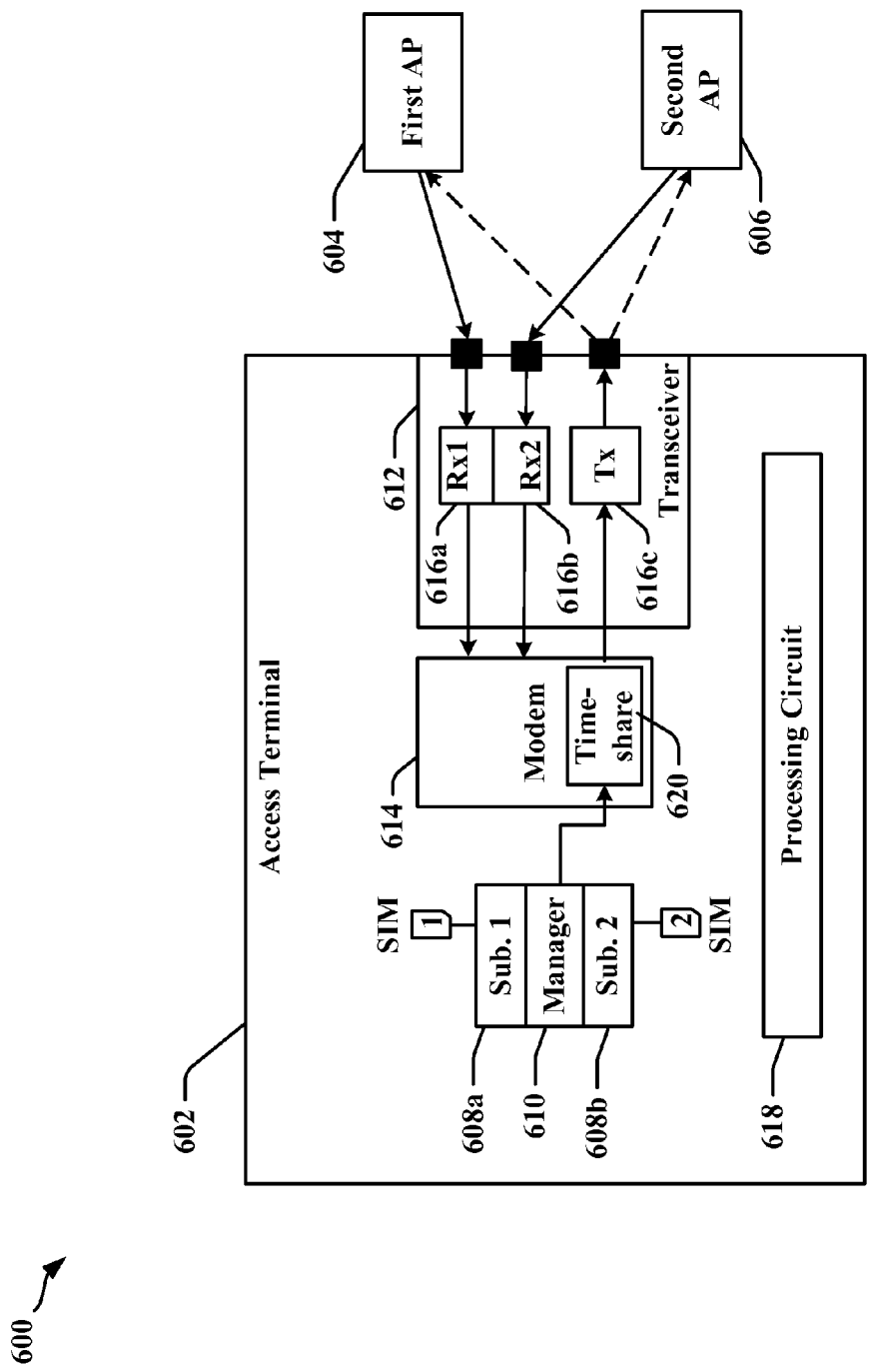
FIG. 6 is a block diagram illustrating a multi-SIM device configured for multiple active wireless connections according to certain aspects disclosed herein.

FIG. 6 illustrates an example of an access terminal 602 that may be configured to provide the eDSDS and sDSDA modes described herein. The access terminal 602 may include two Rx chains 616a and 616b and one Tx chain 616c. Each of the two Rx chains 616a and 616b may be assigned to handle downlink communications for one of two active subscriptions 608a or 608b. The subscriptions 608a and 608b may have access to the Tx chain 616c on a timeshared basis. Timeshare logic 620 may be used to provide timeshared access to the Tx chain 616c, under the control and management of the modem 614 and/or the processing circuit 618 in cooperation with the subscription manager 610 and components of the transceiver 612. Timeshare logic 620 may act as a switch and may be logically or physically provided within a modem 614, between the modem 614 and a Tx chain 616c, or between the modem 614 and an RF card or device.

Elements of the timeshare logic 620 may be provided within the modem 614, the transceiver 612 or the Tx chain 616c. The timeshare logic 620 may be provided between the modem and an RF card, within the RF card, or elsewhere within the access terminal 602. In some examples, the timeshare logic 620 may include one or more modules provided in the modem 614, the processing circuit, the manager 610 and/or the transceiver 612, where the one or more modules control and configure a logical or physical data path through the modem 614 and the transceiver 612. In one example, the timeshare logic 620 may be implemented as a state machine whereby different states determine access to the shared Tx chain 616c. In another example, a module of the processing circuit 618 may configure the modem 614 to block data related to one subscription 608a, 608b and to pass data related to the other subscription 608b, 608a to the transceiver 612.

In some instances, a plurality of Rx chains 616a and 616b is provided within the transceiver 612 such that the access terminal 602 may concurrently monitor and receive downlink communications for each subscription 608a and/or 608b, while the Tx chain 616c is timeshared. In another example, the access terminal 602 may provide a single active Rx chain 616a or 616b and a single Tx chain 616c, and the access terminal 602 may apply timesharing to both the active Rx chain 616a or 616b and the Tx chain 616c when two traffic calls are active for the two subscriptions 608a and 608b. While certain devices may have multiple transceivers 612 and/or multiple Rx chains 616a, 616b and Tx chains 616c that can be selectively and individually disabled, certain advantages may accrue when the access terminal 602 has a limited number of Rx chains 616a, 616b and Tx chains 616c. For example, fewer RF circuits and other devices may be required when the number of transceivers 612 and/or Rx chains 616a, 616b and Tx chains 616c is limited, leading to reduced cost of manufacture, reduced power consumption and more compact circuit boards.

Figure 7:
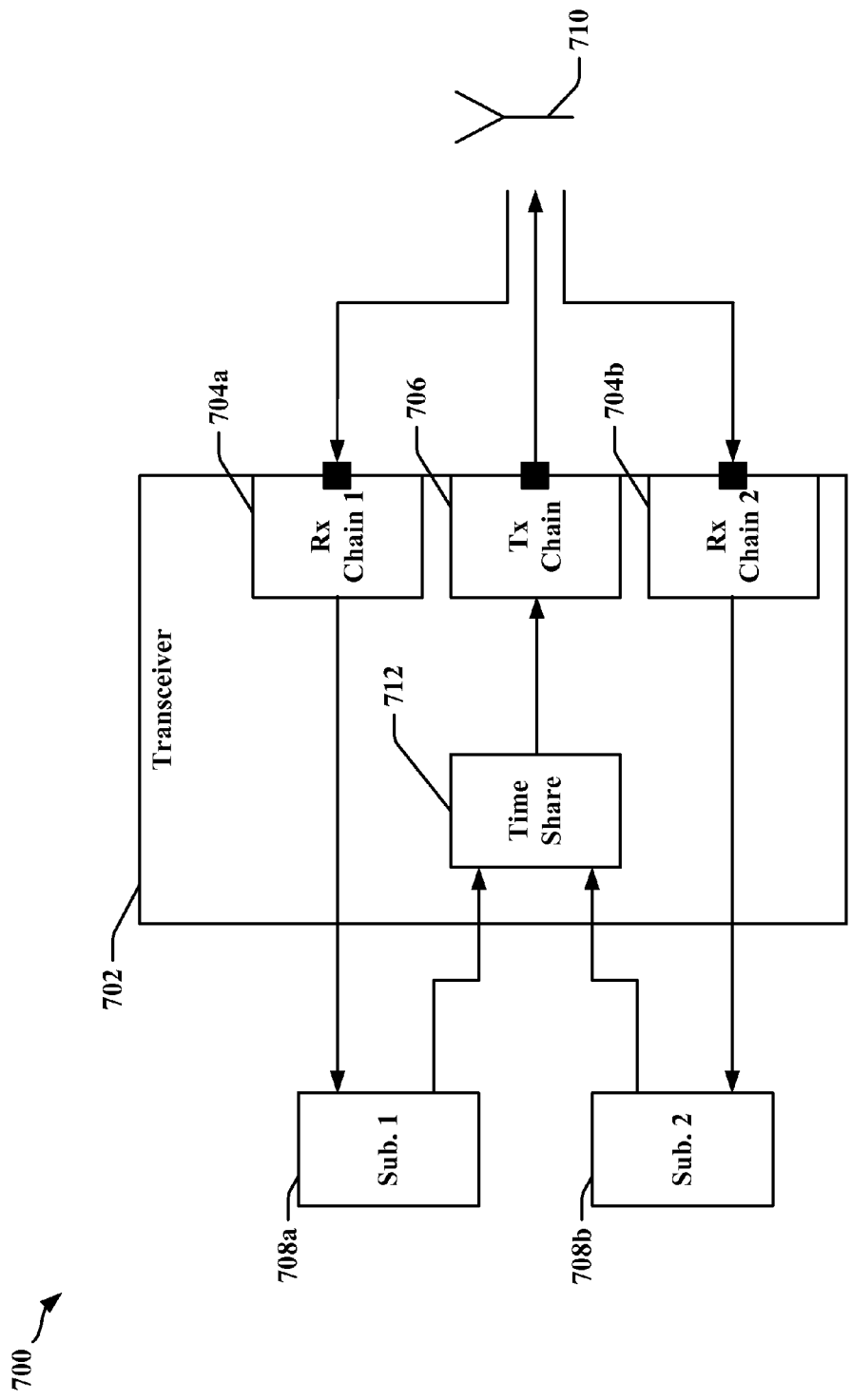
FIG. 7 is a block diagram illustrating a transceiver of a multiple active wireless device that includes two receive chains and one transmit chain.

FIG. 7 is a simplified schematic block diagram 700 illustrating a transceiver 702 that may be provided in the access terminal 602 (see FIG. 6). The transceiver 702 includes two Rx chains 704a and 704b and a single Tx chain 706. The Rx chains 704a and 704b and the Tx chain 706 may be coupled to one or more antennas 710. The transceiver 702 may be configured to support the eDSDS mode and/or sDSDA mode operation disclosed herein. In one example, the transceiver 702 may concurrently maintain a connection with a first network for a first subscription 708a and a connection with a second network for a second subscription 708b. In one example, the first network may be implemented using 1xRTT, EV-DO, W-CDMA, LTE, GSM, etc., while the second network may be implemented using GSM, for example. In the illustrated example, the access terminal 602 may monitor downlink communications for both subscriptions 708a, 708b on the separate Rx chains 704a and 704b. On the uplink, the access terminal 602 may cause the subscriptions 708a and 708b to share the Tx chain 706.

Timeshare logic 712 may be operated according to a timesharing schedule that determines when the transmit chain 616c is allocated for use of two or more subscriptions 608a, 608b. The timesharing circuit 712 may be a component of the transceiver 702 or of another component, module or device within a modem, between the modem and an RF card, within the RF card, or elsewhere within the access terminal 602. In one example, a timesharing scheme may be implemented using timeshare logic 712 that may be configured to buffer data and subsequently transmit buffered data according to a timesharing schedule. In another example, the timesharing schedule may allocate uplink time slots that enable the access terminal 602 to transmit and receive control information for each of the two active connections. The timesharing schedule may prioritize the connections and allocate uplink time slots for data transmission according to the prioritization.

In some examples, the timesharing schedule can be dynamically changed. The timesharing schedule may be modified based on channel conditions and call priorities. For example, the timesharing schedule may favor a voice call established for a first subscription 708a when a data call is established for the second subscription 708b and a user of the access terminal 602 is physically located at an edge of a cell of a network in which the voice call has been established. In the latter example, a timesharing schedule may be configured to provide more transmission and/or reception time for the voice call at the penalty of data call performance. In other examples, a timesharing schedule may be dynamically adapted to give preference to one of two calls based on quality of service requirements associated with the calls, identity of the networks or network providers, radio access technology used to establish and maintain calls, roaming status, and other priorities associated with the calls.

According to certain aspects, the timesharing circuit 712 may operate to gate, delay or blank transmissions related to one subscription 708a or 708b when the other subscription 708b or 708a has information to be transmitted. In one example, the access terminal 602 may suspend or gate transmissions related to a connection with the first network, which may be a 1xRTT, EV-DO, W-CDMA, LTE or GSM network, in order to accommodate transmissions associated with the second network, which may be a GSM network, for example.

In a further aspect of the disclosure, the access terminal 602 may make certain transmit power adjustments in order to support timesharing on the uplink. For example, the traffic-to-pilot (T2P) power ratio for a channel may be boosted and/or certain power control information may be specially processed, given that two subscriptions have been provisioned for the access terminal 602. In another example, an overhead channel gain may be increased. In another example, an ACK channel may be blanked as desired or necessary.

In certain examples, the access terminal 602 may revert to conventional behavior according to a fallback protocol or procedure when blanking or gating transmissions on the uplink for the first or second network becomes difficult to sustain. For example, blanking and/or gating transmissions may become inoperable when very high transmit power is required in 1xRTT, EV-DO, CDMA (including W-CDMA) and LTE networks at the edge of one or more cells. Fallback may include idling or disconnecting one of two current connections and redirecting further voice calls for the subscription 708a or 708b associated with the idled connection to voicemail. Fallback may also occur when extreme RF co-existence issues arise. Fallback may include reverting to DSDS modes of operation and/or adopting protocols and behaviors consistent with DSDS modes of operation.

Figure 8:
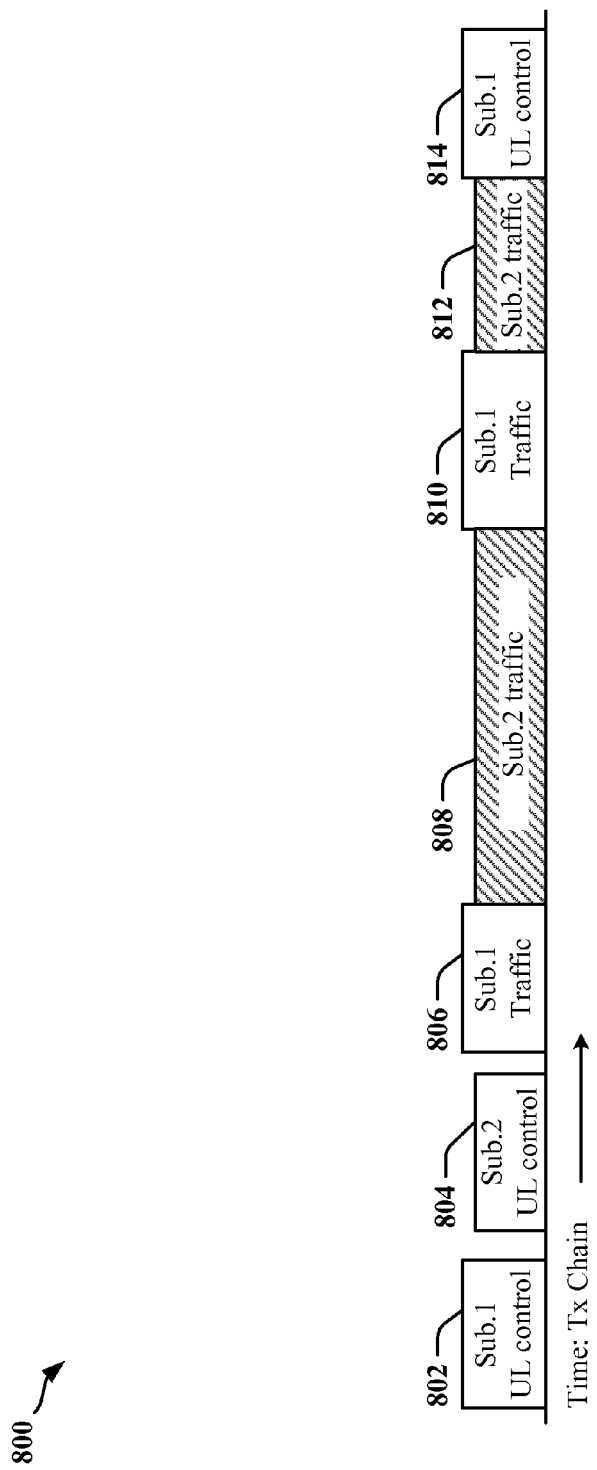
FIG. 8 is a timing diagram illustrating timesharing of a transmit chain in a multiple active wireless device.

FIG. 8 is a simplified timing diagram 800 illustrating timesharing of a Tx chain 706 (see FIG. 7). For the purposes of facilitating this description only, it will be assumed that a network connection associated with the second subscription 708b has a higher priority than the network connection associated with the first subscription 708a. In the example, the access terminal 602 may transmit control information for the first subscription 708a in a first series of time slots 802 and 814, and may transmit control information for the second subscription 708b in a second series of time slots 804. The access terminal 602 may suspend or gate active transmission of traffic 806 and 810 for the first subscription 708a when traffic and/or control data becomes available for transmission in one or more slots 804, 808, 812 from the second subscription 708b.

Figure 9:
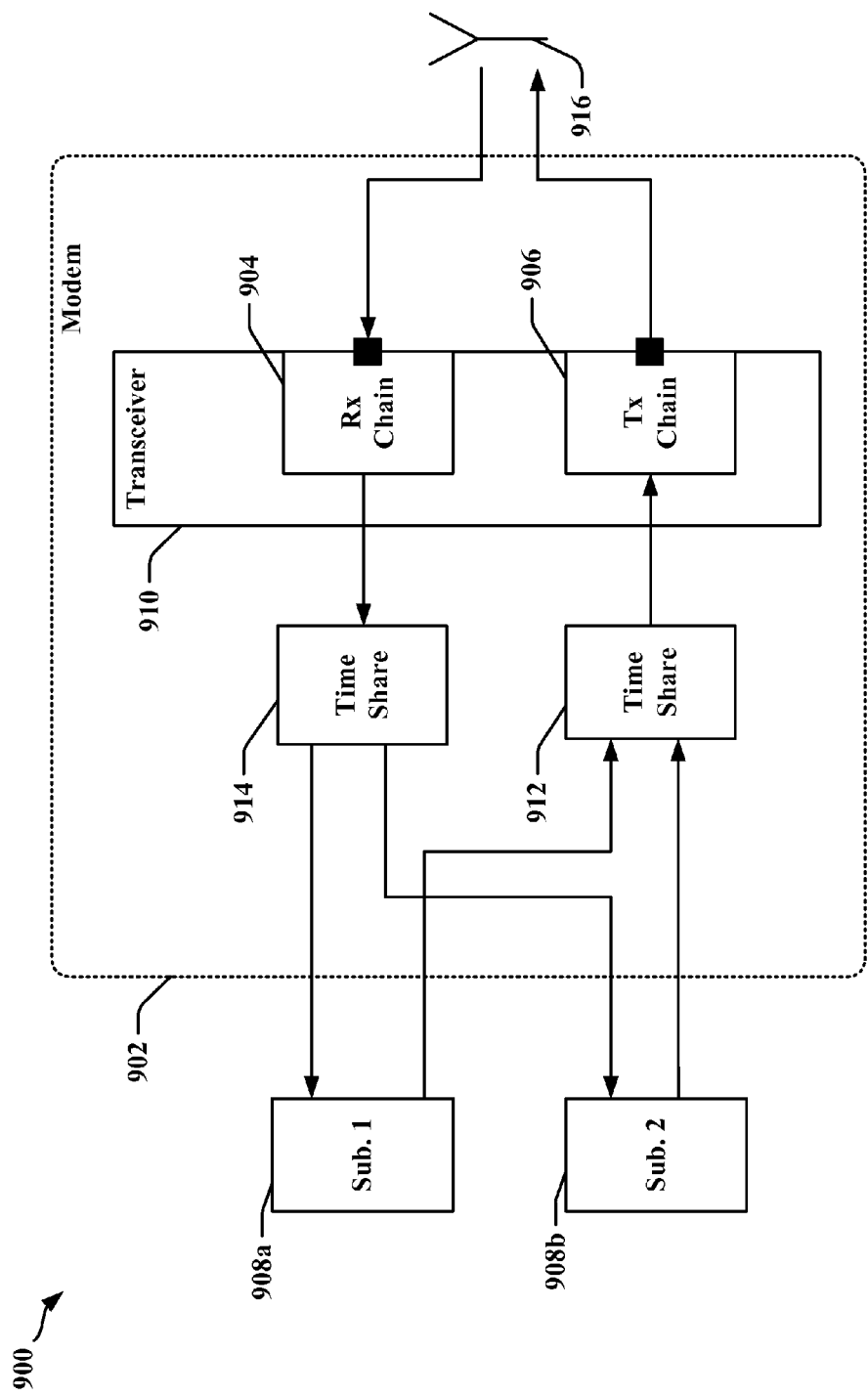
FIG. 9 is a block diagram illustrating a transceiver that has one receive chain and one transmit chain and is configured to support multiple active wireless connections according to certain aspects disclosed herein.

FIG. 9 is a simplified schematic block diagram 900 illustrating a transceiver 910 in an access terminal 602 that has a single Rx chain 904 and a single Tx chain 906. In this example, the transceiver is depicted as a component of a modem 902, although the principles and/or aspects described herein apply equally to examples where some or all of the circuits of the transceiver 910 may be provided separately or externally of the modem 902. For example, one or more of the transmit timeshare logic 912 and the receive timeshare logic 914 may be provided between separate modem devices or circuits and transceiver devices or circuits.

Timeshare logic 912, 914 may switch between subscriptions 908a and 908b, in accordance with a timeshare schedule. The transmit timeshare logic 912 may be configured to drop one or more frames, slots or packets related to a first call when the second call is scheduled to have access to the transmit chain 906. In one example, one or more packets associated with a voice call may be dropped when the packets have sufficient redundancy. Similarly, the receive timeshare logic 914 may be configured to skip one or more frames, slots or packets related to a first call when the second call is scheduled to have access to the receive chain 904.

The Rx chain 904 and the Tx chain 906 may be coupled to one or more antennas 916. The transceiver 910 may be configured to support the eDSDS mode of operation and/or sDSDA mode of operation disclosed herein. In one example, the transceiver 910 may maintain concurrent connections with a first network for a first subscription 908a and with a second network for a second subscription 908b. The first network may be implemented using 1xRTT, EV-DO, W-CDMA, LTE, GSM, etc., while the second network may be implemented using GSM, for example.

The access terminal 602 may monitor downlink communications for both subscriptions on the same Rx chain 904. In one example, the access terminal 602 may monitor the downlink connections according to a coordinated paging schedule. In some instances, the access terminal 602 may monitor both links simultaneously, when both subscriptions 908a and 908b have acquired the same network and cell.

Timeshare logic 914 may be provided to coordinate downlink activities, and to direct control information and traffic to the appropriate subscription 908a or 908b. The timeshare logic 914 may be a component of the modem 902, the transceiver 910, or of another component, module, circuit or device within a modem, between the modem and an RF card, within the RF card, or elsewhere within the access terminal 602. The timeshare logic 914 may provide timeshared access to the Rx chain 904, under the control and management of a processing circuit of the modem 902 or another component of the access terminal 602. Timeshare logic 914 may act as a switch. Timeshare logic 914 may include one or more modules of a processing circuit, the modem 902 and/or the transceiver 910, where the one or more modules control and configure a logical or physical data path through the modem 902 and the transceiver 910. In one example, the modem 614 may be configurable to block data related to one subscription 608a, 608b and to pass data related to the other subscription 608b, 608a to the transceiver 612.

The access terminal 602 may be configured or adapted to handle apparent signaling discontinuities due to timesharing of a single Rx chain 904. For example, discontinuities may occur in pilot signals when the use of the Rx chain 904 switches between a first subscription and a second subscription, where the two subscriptions use different RATs, or different channels in the same RAT. One or more processing circuits that handle configuration and control information associated with a first subscription 908a or 908b may be adapted to accommodate disruptions in the reception of signaling directed to the first subscription 908a or 908b while the time sharing circuit or module 914 is permitting the second subscription 908b or 908a access to the Rx chain 904. For example, pilot and/or media access control (MAC) message processing may be halted as needed to support switching between connections. Moreover, phase discontinuities may be introduced in pilots due to the operation of the timesharing circuit or module 914, and special pilot processing may be required to recognize and correct for such phase discontinuities. For certain RATs, special preamble detection handlers and/or rate control loop handlers may be employed.

On the uplink, the access terminal 602 may share the Tx chain 906. A timesharing scheme may be implemented using timeshare logic 912 that may be configured as a switch. The timeshare logic 912 may be configured to buffer and transmit buffered data according to a predefined schedule. The timesharing module 912 may be a component of the transceiver 910 or of another component, module or device within a modem, between the modem and an RF card, within the RF card, or elsewhere within the access terminal 602. Timeshare logic 912 may act as a switch and may be logically or physically provided within the modem 902, or between the modem 902 and the Tx chain 906. Timeshare logic 912 may be embedded within the Tx chain 906. Timeshare logic 912 may include one or more modules of a processing circuit, the modem 902 and/or the transceiver 910, where the one or more modules control and configure a logical or physical data path through the modem 902 and the transceiver 910. In one example, timeshare logic 912 may configure the modem 902 to block data related to one subscription 908a, 908b and to pass data related to the other subscription 908b, 908a to the transceiver 910.

According to certain aspects, the uplink timesharing module 912 may operate to gate, delay or blank transmissions related to one subscription 908a or 908b when the second subscription 908b or 908a has information to be transmitted. In one example, the access terminal 602 may suspend or gate transmissions related to a connection with the first network in order to accommodate transmissions associated with the second network, when the connection with the second network is assigned a higher priority. Certain transmit power adjustments may be required to support timesharing on the uplink. For example, the T2P power ratio for a channel may be boosted and certain power control information may be ignored, given that two subscriptions have been provisioned for the access terminal 602. Certain combinations of connections may not be amenable to partial gating or blanking. For example, partial blanking may be precluded when two networks are substantially scheduled such that timing of data transmission on one call may correspond with an ACK channel scheduled on a second call. In the latter example, performance degradation due to partially gating of an ACK channel may be higher than the performance degradation due to a completely gated ACK channel.

According to certain aspects, the access terminal 602 may revert to conventional behavior for both the uplink and downlink connections, and in accordance with a fallback protocol or procedure when blanking or gating transmissions on an uplink for a first or second network becomes difficult to sustain. Fallback may also occur when extreme co-existence issues arise and/or when certain channel conditions, including high loading or high transmit power arise. For example, blanking and/or gating transmission may become inoperable when very high transmit power is required in 1xRTT, 1xEV-DO, W-CDMA, TD-SCDMA and LTE networks. High transmit power may be required at a cell edge. Fallback may include idling one of two current connections and redirecting further voice calls to voicemail. Fallback may include reverting to DSDS mode and/or adopting protocols and behaviors consistent with DSDS mode. When falling back to DSDS mode, different RATs may compete based on their priority and other characteristics and factors. For example, priorities may be determined based on the type of call, the type of network, quality of service requirements associated with a call, and so on. In some instances, a call that is experiencing quality and/or power issues, such as a call connected from the edge of a cell, may be assigned a lower priority.

According to certain aspects disclosed herein, an access terminal 502 (see FIG. 5) that is adapted or configured for eDSDS and/or sDSDA may be further configured to adapt its behavior to modify, enhance or enable timesharing schemes when the active connections include one or more connections with a GSM network 520 and/or 522.

For example, the power monitoring duration used in a GSM network 520 and/or 522 may be reduced to occupy less than a complete GSM time slot. The power monitoring duration may be restricted to a portion of the complete time slot. In one example, power monitoring may be limited to a 327 μs period.

The frequency of power monitoring during a traffic state may be reduced. In a conventional GSM network 520 and/or 522, the frequency of power monitoring may be set to accommodate up to 32 neighboring cells. The access terminal 502 may adaptively configure the frequency based on the number of neighbors detected by the access terminal 502 or an expected maximum number of neighbors to be measured. Typically, the access terminal 502 can detect 16 or fewer neighbors that should be monitored and the frequency of power monitoring can be modified accordingly.

An access terminal 502 that is adapted or configured for eDSDS and/or sDSDA may be further configured to perform wideband power scans and power monitoring to reduce power monitoring overhead. The access terminal 502 may be configured to search across multiple RATs for cells or sectors of a RAN that can provide service to the access terminal 502. The extent of the search may be significantly increased when different RATs are involved. For example, service from a GSM network may be provided in one of several hundred channels, and a search for an absolute radio frequency number (ARFCN) in a GSM network may take significant time, particularly where access to a single Rx chain 516a is shared between subscriptions 508a and 508b in an access terminal 502. When the access terminal is configured to scan networks that use different RATs, the task of searching becomes even more onerous.

An access terminal 502 that is adapted or configured for eDSDS and/or sDSDA may be equipped with a transceiver 512 that provides a wideband receiver and/or plural local oscillators that can be used for rapid scanning for carrier frequencies associated with one or more RATs. The wideband receiver and/or local oscillators may be used to analyze power distribution in a wide spectrum of frequencies associated with different RATs using signal processing circuits and modules such as fast Fourier transform (FFT) circuits and processors. In one example, the search may yield a power distribution that indicates the presence of signals of interest at one or more carrier frequencies of a supported RAT. An FFT processor and other circuits may perform a narrowband analysis around signals of interest in an order determined by the relative power of the signals of interest.

In another aspect, certain types of data may be decoded without receiving every frame or slot used to transmit the data. For example, audio data transmitted on a GSM network typically includes speech encoded using an Adaptive Multi-Rate (AMR) audio codec that operates according to an audio data compression scheme optimized for speech coding. The AMR codec may produce toll quality speech data rates of 7.4 kbit/s. The AMR codec may use link adaptation to select from one of eight bit rates based on link conditions. Accordingly, there may be sufficient redundancy in voice packets after encoding for transmission to drop a GSM slot or frame without losing the ability to decode the complete voice signal. A voice packet may be decoded even if data in the voice transmission is not transmitted and, in some instances, the access terminal 602 that is adapted or configured for eDSDS and/or sDSDA operation may be able to drop up to 1 out of every 4 frames when the AMR codec is producing full-rate downlink or uplink speech data.

According to certain aspects disclosed herein, slots and/or frames may be dropped by the access terminal 602 when there is sufficient margin in the encoded voice packet to permit early decoding. Early decoding provided in GSM networks can increase system capacity and reduce receiver power consumption. In one example, early decoding may be used for decoding a message on a control channel in a wireless communication system, where the control channel may be a common control channel (CCCH), a paging channel (PCH) or a broadcast control channel (BCCH) in a GSM system. Early decoding may be used in other RATs. Early decoding can be performed when a message is encoded and partitioned into multiple data blocks that are transmitted at different times if a portion of the multiple data blocks include sufficient information to recover the complete message. For example, a paging message transmitted in a GSM network may be encoded and partitioned into four blocks, which are transmitted as four bursts. The complete message may be recovered at the receiving access terminal 602 from two or more bursts, depending on channel conditions.

The receiving access terminal 602 in a GSM network may determine when the complete message has been decoded based on error detection elements transmitted in the message. The access terminal 602 may go to sleep upon early decoding of the complete message, thereby conserving battery power and extending standby time of the access terminal. If the access terminal 602 is unable to decode the complete message after receiving two bursts, the access terminal 602 may receive a third burst and access terminal 602 may go to sleep if the complete message can be decoded from the three bursts. Normal decoding is performed if the message cannot be decoded from less than four bursts in this example. In another example, an access terminal 602 that is adapted or configured for eDSDS and/or sDSDA operation may drop one or more GSM slots associated with a voice packet when the voice packet has sufficient redundancy to permit early decoding.

The access terminal 602 that is adapted or configured for eDSDS and/or sDSDA operation may maintain two active calls, where one of the calls, such as a GSM call, is placed on hold. Certain characteristics of an on-hold call are different from a call in which there is no speech activity. For example, one or more signaling tones may be transmitted for a GSM call that is on-hold, whereas the active call with no speech activity may have nothing but noise to transmit, which may result in lower power transmission than the power associated with the transmission of tones corresponding to an on-hold call. In certain instances, the access terminal 602 that is adapted or configured for eDSDS and/or sDSDA may provide a structured signal to the voice encoder for the "on-hold" call to obtain low-power silent frames for transmission in place of frames that transmitted with signaling tones when a GSM call is on hold. The silent frames may be substituted for all or a portion of frames that carry the tones.

In certain instances, additional blanking of transmissions may be attempted when a first call is a GSM call and is on hold. More aggressive blanking may be implemented when, for example, the sustainability of a 1xRTT, EV-DO, W-CDMA, LTE call is at risk.

When traffic calls for both the first and second subscriptions 608a, 608b are connected on a GSM network, it may be possible that both subscriptions 608a, 608b may be allocated the same time slot. In some instances, the access terminal 602 that is adapted or configured for eDSDS and/or sDSDA operation may drop the call that has the lowest priority, in order to cause the lower priority call to be reconnected with a new slot allocation.

Figure 10:
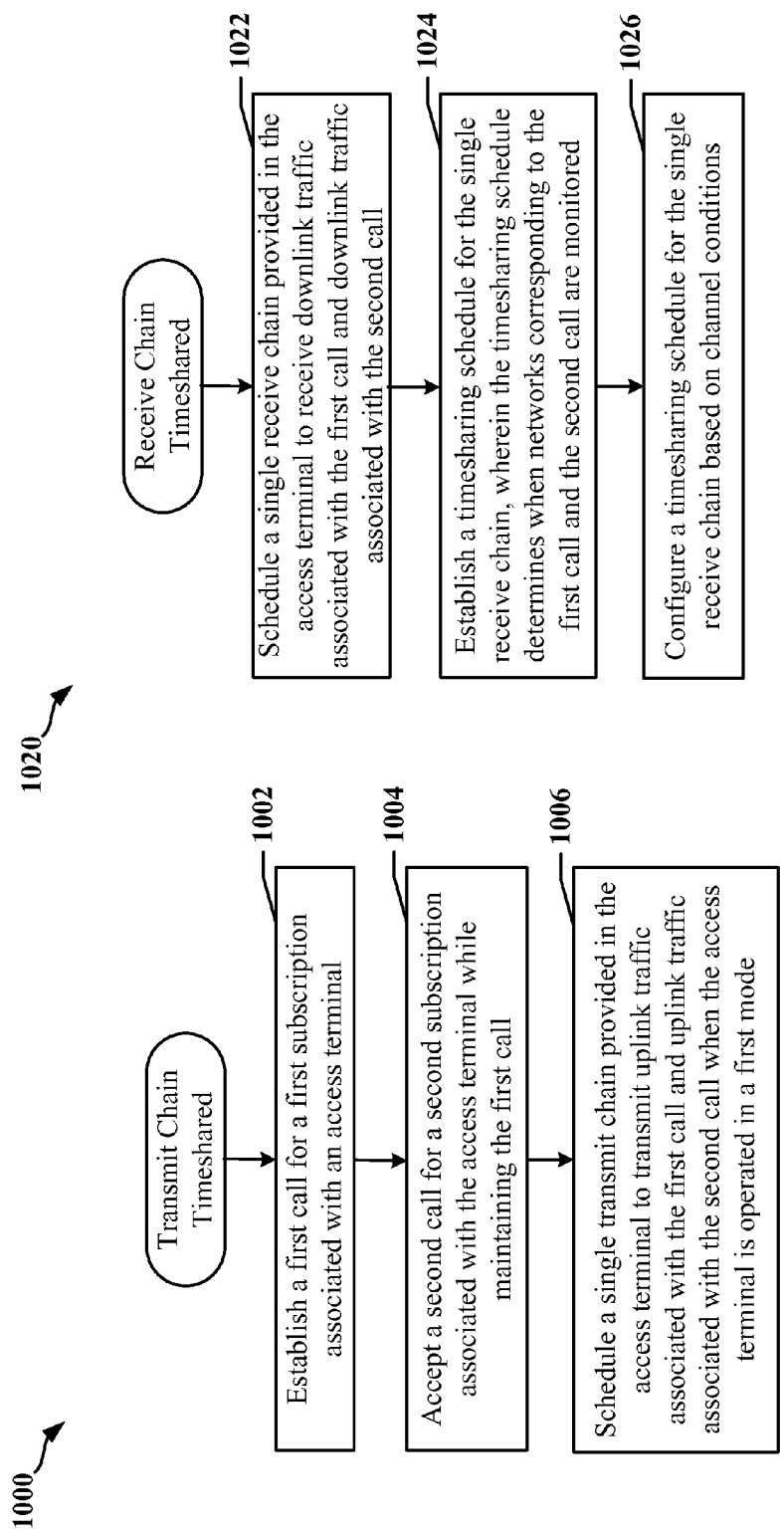
FIG. 10 is a flowchart illustrating a method of managing multiple connections for a wireless device.

FIG. 10 includes flowcharts illustrating methods of managing multiple subscriptions in a wireless device. Certain steps of the methods may be performed by an access terminal 502 of FIG. 5, the access terminal 602 of FIG. 6 and/or elements or components of an access terminal 502 or 602, such as the transceivers 702, 910 shown in FIGS. 7 and 9, respectively.

The access terminal 602 may include a single RF transmit chain 616c which may be timeshared in accordance with the method illustrated by the "Transmit Chain" flowchart 1000, for example. At step 1002, the access terminal 602 establishes a first call for a first subscription associated with the access terminal 602.

At step 1004, the access terminal 602 accepts a second call for a second subscription associated with the access terminal 602 while maintaining the first call in an active state. The first call may be maintained in an active state that is an on-hold state. The first subscription may correspond to an IMSI maintained on a first SIM, and wherein the second subscription corresponds to an IMSI maintained on a second SIM. Accepting the second call may include increasing transmit power for the single RF transmit chain.

At step 1006, the access terminal 602 schedules the single RF transmit chain 616c provided in the access terminal 602 for uplink transmissions associated with the first call and uplink transmissions associated with the second call when the access terminal 602 is operating in a first mode. In one example, the first mode may be a DSDA mode. Uplink transmissions may include data traffic and/or control channel and signaling transmissions. The single RF transmit chain 616c provided in the access terminal 602 may be scheduled to restrict uplink transmissions to a single call when the access terminal 602 is operating in a second mode. In one example, the second mode may be a DSDS mode. The access terminal 602 may fall back to the second mode from the first mode when one or more channel conditions are determined to be present. The channel conditions may include high network loading, high transmit power or adverse radio frequency (RF) coexistence conditions. In one example, network loading can be expected to be high when a large number of users are very active in the network. In another example, transmit power may be considered high at 20 dBm in a CDMA context, where 24 dBm is typically considered an upper limit of transmit power. The thresholds at which network loading and/or transmit power is considered to be high may vary according to the network technology used, configuration and/or battery capacity of an access terminal, RF coexistence protocols and other factors.

In another aspect of the disclosure, scheduling the single RF transmit chain 616c may include establishing a timesharing schedule for the single RF transmit chain 616c. A switch provided between a modem and the single RF transmit chain 616c may be controlled in accordance with the timesharing schedule. The timesharing schedule may determine timing of the uplink transmissions associated with the first call and the uplink transmissions associated with the second call on the single RF transmit chain 616c. In one example, the timesharing schedule may include decreasing a duration in which the power of one or more neighboring transmitters is monitored in a GSM network.

In another aspect of the disclosure, scheduling the single RF transmit chain or scheduling the single RF receive chain may include dynamically adapting a frequency at which transmitter power of a number of neighboring transmitters is monitored based on the number of the neighboring sectors. Scheduling the single RF transmit chain or scheduling the single RF receive chain may include decreasing a power monitoring duration for a GSM network. Scheduling the single RF transmit chain or scheduling the single RF receive chain may include dropping one or more frames of a speech packet to be transmitted on the uplink based on channel conditions. In one example, 1 out of every 4 frames may be dropped or skipped. Scheduling the single RF transmit chain or scheduling the single RF receive chain may include skipping a portion of a plurality of frames of a speech packet to be received on the downlink based on channel conditions. Scheduling the single RF transmit chain or scheduling the single RF receive chain may include skipping a portion of a plurality of frames of a speech packet to be received on the downlink when the speech packet is decoded using early decoding. Scheduling the single RF transmit chain or scheduling the single RF receive chain may include substituting silent frames for at least a portion of a plurality of frames transmitted or received on a GSM network.

In an aspect of the disclosure, maintaining the first call in an active state may include dropping one or more frames of a speech packet to be transmitted through the single RF transmit chain 616c when the speech packet includes full-rate speech data provided by an adaptive multi-rate audio codec. In one example, the dropped frames may correspond to speech packets of the first call. In another example, frames corresponding to speech packets of the second call may be dropped while maintaining the second call.

In an aspect of the disclosure, the first call is established as a highest priority call, and uplink transmissions associated with the second call are gated when uplink transmissions associated with the first call are required for transmission. The uplink transmissions associated with the second call that are gated may include an ACK channel transmission. All ACK channel transmissions associated with the second call may be fully gated when the uplink transmissions associated with the second call are gated, including when network scheduling of the first call requires the ACK channel transmission associated with the second call to be partially gated.

In various aspects of the disclosure, the first call is established on a GSM network and the second call is established on a CDMA network, a UMTS network configured for W-CDMA or TD-SCDMA, an LTE network (including LTE-FDD, LTE-TDD/TD-LTE networks), a cdma2000 EV-DO network, a cdma2000 1xRTT network, or a TD-SCDMA network. In another example, the first and second calls may be established on two different GSM networks, or the same GSM network. In yet another example, the first call may be established on an LTE network configured for FDD or TDD network and the second call may be established on a cdma2000 1xRTT network.

In an aspect of the disclosure, accepting the second call includes boosting a traffic-to-pilot ratio or increasing overhead channel gain.

An access terminal 602 may include a single RF receive chain 904 (see FIG. 9), or the access terminal may operate using one of a plurality of available receive chains 616a or 616b. The single RF receive chain 904, 616a or 616b may be timeshared in accordance with the method illustrated by the "Receive Chain" flowchart 1020, for example. At step 1022, the access terminal 602 may schedule a single RF receive chain 904, 616a or 616b provided in the access terminal 602 to receive downlink traffic associated with the first call and downlink traffic associated with the second call.

At step 1024, the access terminal may establish a timesharing schedule for the RF receive chain 904, 616a or 616b in order to schedule the RF receive chain 904, 616a or 616b. A switch provided between a modem and the RF receive chain 904, 616a or 616b may be controlled in accordance with the timesharing schedule. The timesharing schedule may determine when networks corresponding to the first call and the second call are monitored. The RF receive chain 904, 616a or 616b may be scheduled by decreasing a power monitoring duration for a GSM network.

At step 1026, the access terminal 602 may configure the timesharing schedule for the RF receive chain 904, 616a or 616b based on channel conditions. In another aspect of the disclosure, scheduling a RF receive chain 904, 616a or 616b may include configuring a timesharing schedule corresponding to the RF receive chain 904, 616a or 616b based on channel conditions. In one example, the configuring the timesharing schedule may include decreasing a duration in which the power of one or more neighboring transmitters is monitored in a GSM network. In another example, configuring the timesharing schedule may include dynamically adapting a frequency at which the transmitter power of neighboring sectors is monitored based on the number of neighboring sectors. Configuring the timesharing schedule for the RF receive chain 904, 616a or 616b may include dropping one or more frames of a speech packet to be transmitted on the uplink. Configuring the timesharing schedule for the RF receive chain 904, 616a or 616b may include causing one or more frames to be skipped based on channel conditions when the speech packet includes full-rate speech data produced by an adaptive multi-rate audio codec. Frames may be skipped when the speech packet is decoded using early decoding. Configuring the timesharing schedule for the single RF receive chain may include substituting silent frames for all or a portion of frames transmitted or received on a GSM network.

In an aspect of the disclosure, the method includes compensating for phase discontinuities in a pilot signal detected on a network corresponding to one of the first call and the second call.

In an aspect of the disclosure, the method includes reducing a frequency at which neighboring transmitter power is monitored.

In an aspect of the disclosure, the first call and the second call are GSM calls, and the first call has a higher priority than the second call and the second call may be dropped when the first call and the second call are allocated a common time slot for communicating on a GSM network.

Figure 11:
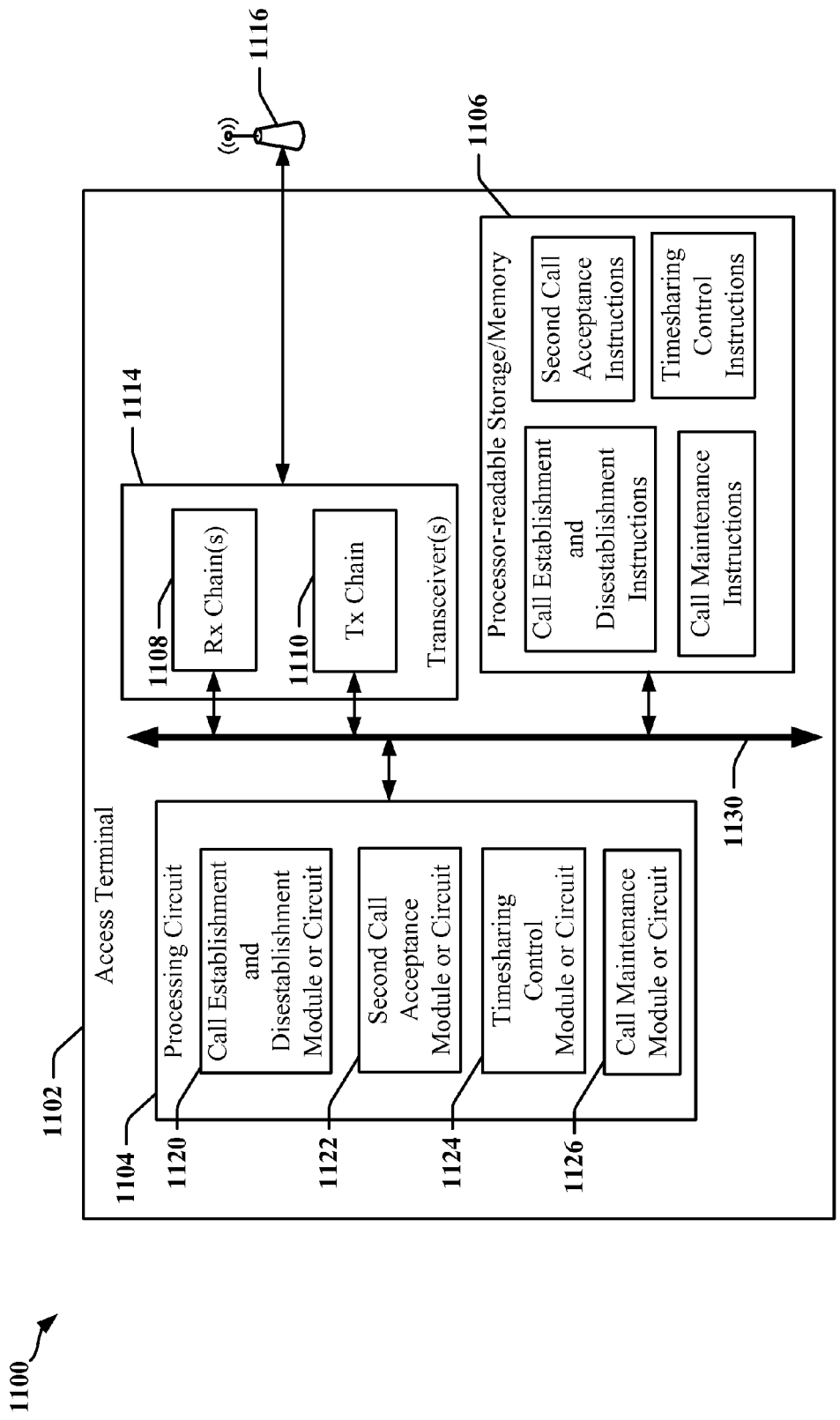
FIG. 11 is a schematic diagram illustrating an apparatus configured to manage multiple connections in a wireless network.

FIG. 11 is a diagram 1100 illustrating an example of a hardware implementation for an access terminal 1102 configured to manage multiple connections for a wireless device. The access terminal 1102 may include an access terminal having a processing circuit 1104. The processing circuit 1104 may be implemented with a bus architecture, represented generally by the bus 1130. The bus 1130 may include any number of interconnecting buses and bridges depending on the application and attributes of the processing circuit 1104 and overall design constraints. The bus 1130 may link together various circuits including one or more processors and/or hardware modules, processing circuit 1104, and the processor-readable medium 1106. The bus 1130 may also link various other circuits such as timing sources, peripherals, voltage regulators, and power management circuits, which are well known in the art, and therefore, will not be described any further.

The processing circuit 1104 may be coupled to one or more communications interfaces or transceivers 1114. The one or more communications interfaces 1108, 1110 may be used for communications with entities of a core network, and includes one or more of a Tx chains 1110 and one or more Rx chains 1108. The one or more Tx chains 1110 and the one or more Rx chains 1108 may be coupled to one or more internal and/or external antennas 1116.

The processing circuit 1104 may include one or more processors responsible for general processing, including the execution of software stored on the processor-readable medium 1106. For example, the processing circuit 1104 may include one or more processors deployed in the access terminals 302, 402, 502, 602 of FIGS. 3-6 and/or the transceivers 702, 910 of FIGS. 7 and 9. The software, when executed by the one or more processors, cause the processing circuit 1104 to perform the various functions described supra for any particular access terminal. The processor-readable medium 1106 may also be used for storing data that is manipulated by the processing circuit 1104 when executing software. The processing system further includes at least one of the modules 1120, 1122, 1124 and 1126. The modules 1120, 1122, 1124 and 1126 may be software modules running on the processing circuit 1104, resident/stored in the processor-readable medium 1106, one or more hardware modules coupled to the processing circuit 1104, or some combination thereof.

In one configuration, the access terminal 1102 for wireless communication includes a module or circuit 1120 configured to establish a first call for a first subscription associated with the access terminal 1102, modules or circuits 1122, 1126 configured to accept a second call for a second subscription associated with the access terminal 1102 while maintaining the first call, and a module or circuit 1124 configured to schedule a single RF transmit chain provided in the access terminal for uplink transmissions associated with the first call and uplink transmissions associated with the second call when the access terminal is operating in a DSDA mode. The module or circuit 1124 may cooperate with the Tx chain 1110 of the transceiver 1114. The module or circuit 1124 may be further configured to facilitate receipt of downlink traffic associated with the first call and downlink traffic associated with the second call using a one or more receive chains 1108 provided in the access terminal 1102. One or more Rx chains 1108 may be used to receive downlink communications. The module or circuit 1124 may manage timesharing of an Rx chain 1108 and/or a Tx chain 1110. The call maintenance module or circuit 1126 may maintain the first and second calls. In one example, the call maintenance module or circuit 1126 may include components for dropping the second call when the first call and the second call are allocated a common time slot for communicating on a GSM network, and components that compensate for phase discontinuities in a pilot signal detected on a network corresponding to one of the first call and the second call.

The term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first die may be coupled to a second die in a package even though the first die is never directly physically in contact with the second die.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7, 9 and 11 may be configured to perform one or more of the methods, features, or steps described herein. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of managing multiple connections for an access terminal, comprising:
    establishing a first call at the access terminal for a first subscription associated with the access terminal;
    accepting a second call at the access terminal for a second subscription associated with the access terminal while maintaining the first call in an active state;
    at the access terminal, establishing a transmit timesharing schedule for a single radio frequency (RF) transmit chain of the access terminal, wherein the transmit timesharing schedule determines timing of access to the single RF transmit chain for uplink transmissions associated with the first call and uplink transmissions associated with the second call when the access terminal is operating in a first mode; and
    controlling access to the single RF transmit chain in accordance with the transmit timesharing schedule.

2. The method of claim 1, wherein controlling access to the single RF transmit chain comprises:
    controlling a switch in accordance with the transmit timesharing schedule, wherein the switch is provided within a modem or between the modem and the single RF transmit chain.

3. The method of claim 1, wherein establishing the transmit timesharing schedule for the single RF transmit chain comprises:
    falling back to a second mode from the first mode when one or more channel conditions are determined, the channel conditions comprising high network loading, high transmit power or adverse RF coexistence conditions; and
    scheduling the single RF transmit chain to restrict uplink transmissions to a single call when the access terminal is operating in the second mode.

4. The method of claim 3, wherein two or more subscriber identity modules (SIMs) are installed in the access terminal and wherein the first mode is a dual SIM dual active (DSDA) mode and the second mode is a dual SIM dual stand-by (DSDS) mode.

5. The method of claim 3, further comprising:
    selecting either the first call or the second call to be dropped when the access terminal falls back to the second mode from the first mode, wherein a call is selected to be dropped based on relative priorities of the first call and the second call, channel conditions, or quality of service requirements of the first call or the second call.

6. The method of claim 1, wherein establishing the transmit timesharing schedule comprises:
    configuring the transmit timesharing schedule based on at least one of relative priorities associated with the first call and the second call, channel conditions, or quality of service requirements of the first call and the second call.

7. The method of claim 1, wherein establishing the transmit timesharing schedule comprises:
    configuring the transmit timesharing schedule such that one or more uplink transmissions associated with the first call are gated when an uplink transmission associated with the second call is available or scheduled.

8. The method of claim 1, further comprising:
    fully gating all ACK channel transmissions associated with the first call when network scheduling of the second call requires the ACK channel transmissions associated with the first call to be at least partially gated.

9. The method of claim 1, wherein the first call is established on a Global System for Mobile Communications (GSM) network and the second call is established on one of a GSM network, a Universal Mobile Telecommunications System (UMTS) network, a long-term evolution (LTE) network configured for time-division duplex LTE (LTE-TDD/TD-LTE) or frequency division duplex LTE (LTE-FDD), a Code Division Multiple Access 2000 (cdma2000) Evolution-Data Optimized network, a cdma2000 1xRTT network, or using time division synchronous code division multiple access (TD-SCDMA).

10. The method of claim 1, wherein the first call is established on a cdma2000 1xRTT network and the second call is established on an LTE-FDD or an LTE-TDD/TD-LTE network.

11. The method of claim 1, wherein accepting the second call comprises:
boosting a traffic-to-pilot ratio or increasing overhead channel gain.

12. The method of claim 1, further comprising:
establishing a receive timesharing schedule for a single RF receive chain of the access terminal; and
controlling access to the single RF receive chain in accordance with the receive timesharing schedule,
wherein the receive timesharing schedule determines when networks corresponding to the first call and the second call are monitored.

13. The method of claim 12, wherein controlling access to the single RF receive chain in accordance with the receive timesharing schedule comprises:
controlling a switch in accordance with the receive timesharing schedule,
wherein the switch is provided in a modem or between the modem and the single RF receive chain.

14. The method of claim 12, wherein establishing a receive timesharing schedule comprises:
configuring the receive timesharing schedule based on relative priorities associated with the first call and the second call, channel conditions, or quality of service requirements of the first call and the second call.

15. The method of claim 12, further comprising:
compensating for phase discontinuities introduced in a pilot signal detected on a network corresponding to the first call or the second call,
wherein the phase discontinuities are introduced as a result of controlling access to the single RF receive chain in accordance with the receive timesharing schedule.

16. The method of claim 12, wherein establishing the transmit timesharing schedule or establishing the receive timesharing schedule comprises:
adapting a behavior of the access terminal when one or more calls are active, wherein adapting the behavior includes one or more of:
modifying a frequency of monitoring transmitter power of a number of neighboring transmitters;
modifying a power monitoring duration for a GSM network;
dropping one or more frames of a speech packet in the uplink transmissions;
skipping a portion of a plurality of frames of a speech packet in downlink transmissions; or
substituting silent frames for at least a portion of a plurality of frames transmitted or received on a GSM network.

17. The method of claim 1, wherein the first call and the second call are GSM calls, and wherein the first call has a higher priority than the second call, and wherein the method further comprises:
dropping the second call when the first call and the second call are allocated a common time slot for communicating on a GSM network.

18. An access terminal configured for wireless communication, comprising:
a radio frequency (RF) transmit chain; and
a processing circuit configured to:
establish a first call for a first subscription associated with the access terminal using the RF transmit chain;
accept a second call for a second subscription associated with the access terminal using the RF transmit chain, while maintaining the first call in an active state;
establish a transmit timesharing schedule for the RF transmit chain, wherein the transmit timesharing schedule determines timing of access to the RF transmit chain for uplink transmissions associated with the first call and uplink transmissions associated with the second call when the access terminal is operating in a first operating mode; and
control access to the RF transmit chain in accordance with the transmit timesharing schedule.

19. The access terminal of claim 18, further comprising:
a switch provided within a modem of the access terminal or between the modem and the RF transmit chain,
wherein the switch is operated in accordance with the transmit timesharing schedule to control accesses to the RF transmit chain by the first call and the second call.

20. The access terminal of claim 18, wherein the processing circuit is further configured to:
fall back to a second operating mode from the first operating mode when one or more channel conditions are determined, the channel conditions comprising high network loading, high transmit power or adverse RF coexistence conditions; and
schedule the RF transmit chain to restrict uplink transmissions to a single call when the access terminal is operating in the second operating mode.

21. The access terminal of claim 20, wherein the access terminal is configured to receive two subscriber identity modules (SIMs), and wherein the first operating mode is a dual SIM dual active (DSDA) mode and the second operating mode is a dual SIM dual stand-by (DSDS) mode.

22. The access terminal of claim 20, wherein either the first call or the second call is dropped when the access terminal falls back to the second operating mode from the first operating mode, wherein a call is selected for dropping based on relative priorities associated with the first call and the second call, channel conditions, or quality of service requirements of the first call or the second call.

23. The access terminal of claim 18, wherein the transmit timesharing schedule is configured based on at least one of relative priorities associated with the first call and the second call, channel conditions, or quality of service requirements of the first call and the second call, and
wherein one or more uplink transmissions associated with the first call are gated by a switch when an uplink transmission associated with the second call is available or scheduled.

24. The access terminal of claim 18, further comprising:
an RF receive chain; and
a second switch provided within a modem of the access terminal or between a modem of the access terminal and the RF receive chain, wherein the second switch is operated in accordance with a receive timesharing schedule that controls access to the RF receive chain by the first call and the second call,
wherein the receive timesharing schedule determines when networks corresponding to the first call and the second call are monitored.

25. The access terminal of claim 24, wherein the processing circuit is configured to:
compensate for phase discontinuities introduced in a pilot signal detected on a network corresponding to the first call or the second call, wherein the phase discontinuities are introduced as a result of controlling access to the RF receive chain in accordance with the receive timesharing schedule.

26. The access terminal of claim 24, wherein the processing circuit is configured to:
adapt a behavior of the access terminal when one or more calls are active, wherein adapting the behavior includes one or more of:
modifying a frequency of monitoring transmitter power of a number of neighboring transmitters;
modifying a power monitoring duration for a GSM network;
dropping one or more frames of a speech packet in the uplink transmissions;
skipping a portion of a plurality of frames of a speech packet in downlink transmissions; or
substituting silent frames for at least a portion of a plurality of frames transmitted or received on a GSM network.

27. An access terminal configured to manage multiple wireless calls, comprising:
means for establishing a first call for a first subscription associated with the access terminal;
means for accepting a second call for a second subscription associated with the access terminal while maintaining the first call in an active state;
means for establishing a transmit timesharing schedule for a single radio frequency (RF) transmit chain provided by the access terminal, wherein the transmit timesharing schedule determines timing of access to the single RF transmit chain for uplink transmissions associated with the first call and uplink transmissions associated with the second call when the access terminal is operating in a first mode; and
means for controlling access to the single RF transmit chain in accordance with the transmit timesharing schedule,
wherein the means for controlling access to the single RF transmit chain includes a first switch provided in a modem or between the modem and the single RF transmit chain, and wherein the first switch is operated in accordance with the transmit timesharing schedule.

28. The access terminal of claim 27, further comprising:
means for establishing a receive timesharing schedule for a single RF receive chain provided by the access terminal, wherein the receive timesharing schedule determines when networks corresponding to the first call and the second call are monitored; and
means for controlling access to the single RF receive chain in accordance with the receive timesharing schedule,
wherein the means for controlling access to the single RF receive chain includes a second switch provided in the modem or between the modem and the single RF receive chain and operated in accordance with the receive timesharing schedule.

29. A non-transitory processor-readable storage medium having one or more instructions which, when executed by at least one processing circuit of an access terminal, cause the at least one processing circuit to:
establish a first call for a first subscription associated with the access terminal;
accept a second call for a second subscription associated with the access terminal while maintaining the first call in an active state;
establish a transmit timesharing schedule for a single radio frequency (RF) transmit chain of the access terminal, wherein the transmit timesharing schedule determines timing of access to the single RF transmit chain for uplink transmissions associated with the first call and uplink transmissions associated with the second call when the access terminal is operating in a first mode; and
control access to the single RF transmit chain in accordance with the transmit timesharing schedule, wherein controlling access to the single RF transmit chain includes controlling a first switch in accordance with the transmit timesharing schedule,
wherein the first switch is provided in a modem or between the modem and the single RF transmit chain.

30. The processor-readable storage medium of claim 29, wherein the instructions cause the at least one processing circuit to:
establish a receive timesharing schedule for a single RF receive chain provided by the access terminal, wherein the receive timesharing schedule determines when networks corresponding to the first call and the second call are monitored; and
control access to the single RF receive chain in accordance with the receive timesharing schedule,
wherein controlling access to the single RF receive chain includes controlling a second switch in accordance with the receive timesharing schedule, wherein the second switch is provided in the modem or between the modem and the single RF receive chain and operated.

* * * * *